United States Patent
Pandey et al.

(10) Patent No.: US 10,353,807 B2
(45) Date of Patent: Jul. 16, 2019

(54) APPLICATION DEVELOPMENT MANAGEMENT

(71) Applicant: Accenture Global Solutions Limited, Dublin (IE)

(72) Inventors: Tarun Pandey, Pune (IN); Parag Dave, Pune (IN); Vaibhav Mahendrabhai Shah, Pune (IN); Ratnakar A. Tripathy, Pune (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/248,498

(22) Filed: Aug. 26, 2016

(65) Prior Publication Data

US 2018/0060210 A1    Mar. 1, 2018

(51) Int. Cl.
 *G06F 9/44* (2018.01)
 *G06F 11/36* (2006.01)

(52) U.S. Cl.
 CPC ........ *G06F 11/368* (2013.01); *G06F 11/3688* (2013.01)

(58) Field of Classification Search
 CPC .................................................... G06F 11/368
 USPC ........................................................ 717/124
 See application file for complete search history.

(56) References Cited

U.S. PATENT DOCUMENTS

| 5,758,061 A * | 5/1998 | Plum | G06F 11/3676 714/35 |
|---|---|---|---|
| 7,024,660 B2 * | 4/2006 | Andrade | G06F 11/263 714/25 |
| 8,856,725 B1 * | 10/2014 | Anderson | G06F 8/75 717/103 |
| 2003/0097650 A1 * | 5/2003 | Bahrs | G06F 11/3688 717/124 |
| 2005/0289536 A1 * | 12/2005 | Nayak | G06F 8/61 717/174 |
| 2007/0038977 A1 * | 2/2007 | Savage | G06F 8/20 717/106 |
| 2008/0115114 A1 * | 5/2008 | Palaparthi | G06F 11/3688 717/128 |
| 2008/0127089 A1 | 5/2008 | Peretz et al. | |
| 2008/0282231 A1 * | 11/2008 | R | G06F 11/3684 717/127 |

(Continued)

OTHER PUBLICATIONS

CircleCI, "Continuous Integration and Delivery," https://circleci.com/?gclid=CI-BouWQ9MsCFdCFaAodlRwK-g, Feb. 25, 2016, 6 pages.

(Continued)

*Primary Examiner* — Wei Y Zhen
*Assistant Examiner* — Lanny N Ung
(74) *Attorney, Agent, or Firm* — Harrity & Harrity, LLP

(57) ABSTRACT

A device may receive testing instructions, for testing a computer program product, in a first format. The testing instructions may include testing data and a testing script. The testing data and the testing script may be associated with the first format. The device may identify a set of commands in the first format. The device may extract the set of commands from the first format. The device may convert the testing instructions from the first format to a second format based on extracting the set of commands. The device may execute the testing instructions based on the second format.

20 Claims, 20 Drawing Sheets

(56) References Cited

U.S. PATENT DOCUMENTS

2013/0055194 A1* 2/2013 Weigert .................... G06F 8/10
717/104
2014/0281721 A1* 9/2014 Navalur .............. G06F 11/3684
714/33

OTHER PUBLICATIONS

CircleCI, "Continuous Integration Product and Features," https://circleci.com/features/, Dec. 16, 2015, 5 pages.

Idate et al., "Automated code Generation using Generative Programming Approach for a Mathematical Expression," http://www.bvucoepune.edu.in/pdf's/Research%20and%20Publication/Research%20Publications_2007-08/International%20Conference_2007-08/Automated%20Code%20Mrs%20Gauri%20Rao.pdf, Aug. 2007, 4 pages.

Analytixds, "AnalytiX DS Unified Platform," http://analytixds.com/corporate/analytix-ds-unified-platform-for-enterprise-data-mapping-and-code-automation/, Jan. 16, 2015, 4 pages.

Electric Cloud, "What is Continuous Deployment," http://electric-cloud.com/resources/continuous-delivery-101/continuous-deployment/, May 31, 2015, 7 pages.

Automated-360, "Create your first test with TestComplete," http://automated-360.com/testcomplete-tutorial/create-your-first-test-with-testcomplete/, Mar. 24, 2013, 10 pages.

Hewlett Packard Enterprise, "ALM Software," http://www8.hp.com/in/en/software-solutions/alm-software-development-testing/, Oct. 21, 2014, 8 pages.

Analytixds, "CATFX ETL/ELT Automation," http://analytixds.com/cat-fx-code-automation-templates/, Aug. 7, 2016, 3 pages.

Orban, "Templating and Automatic Code Generation for Performance with Python," https://www.researchgate.net/publication/234037242_Templating_and_Automatic_Code_Generation_for_Performance_with_Python, Jan. 2013, 10 pages.

* cited by examiner

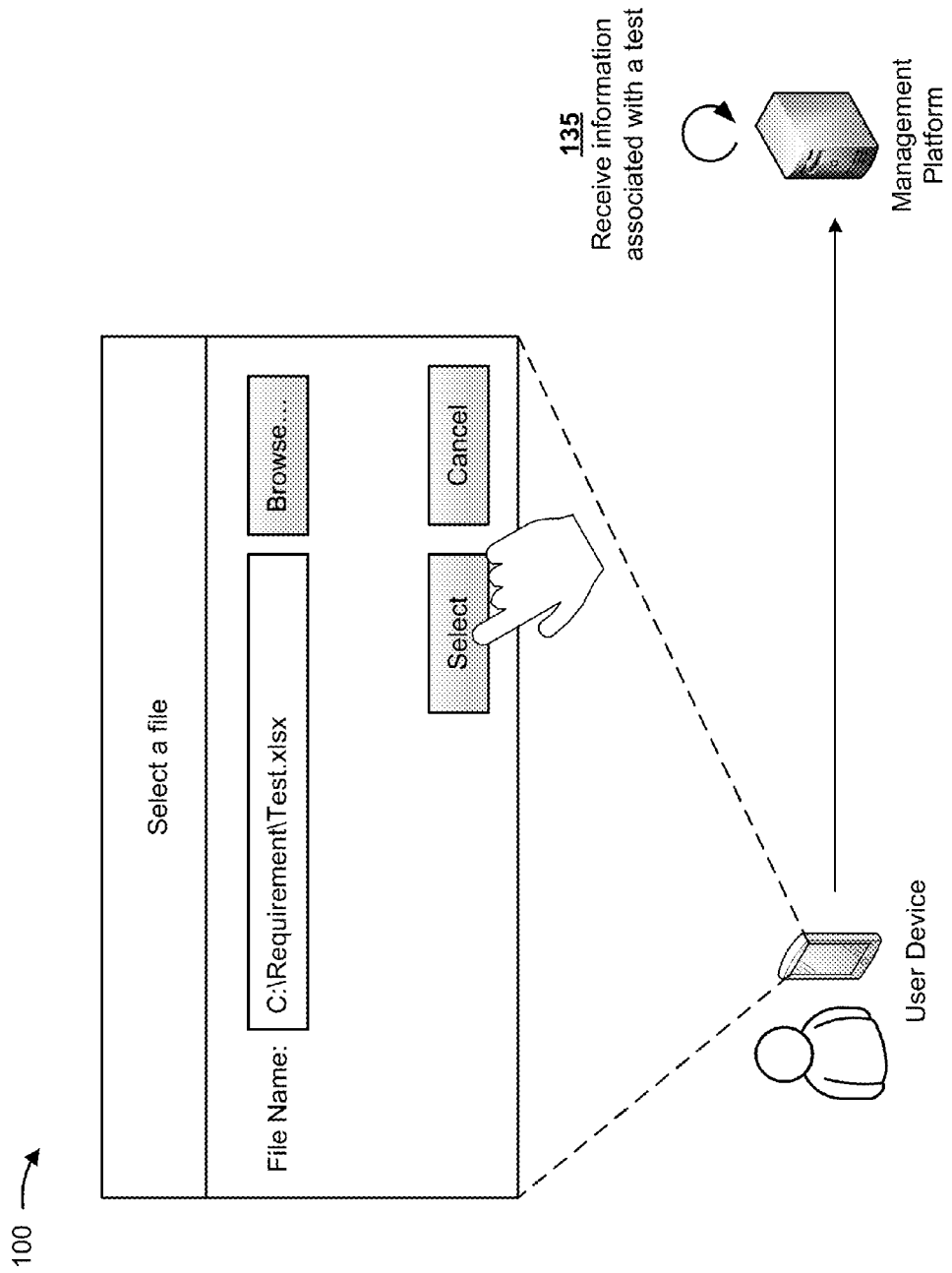

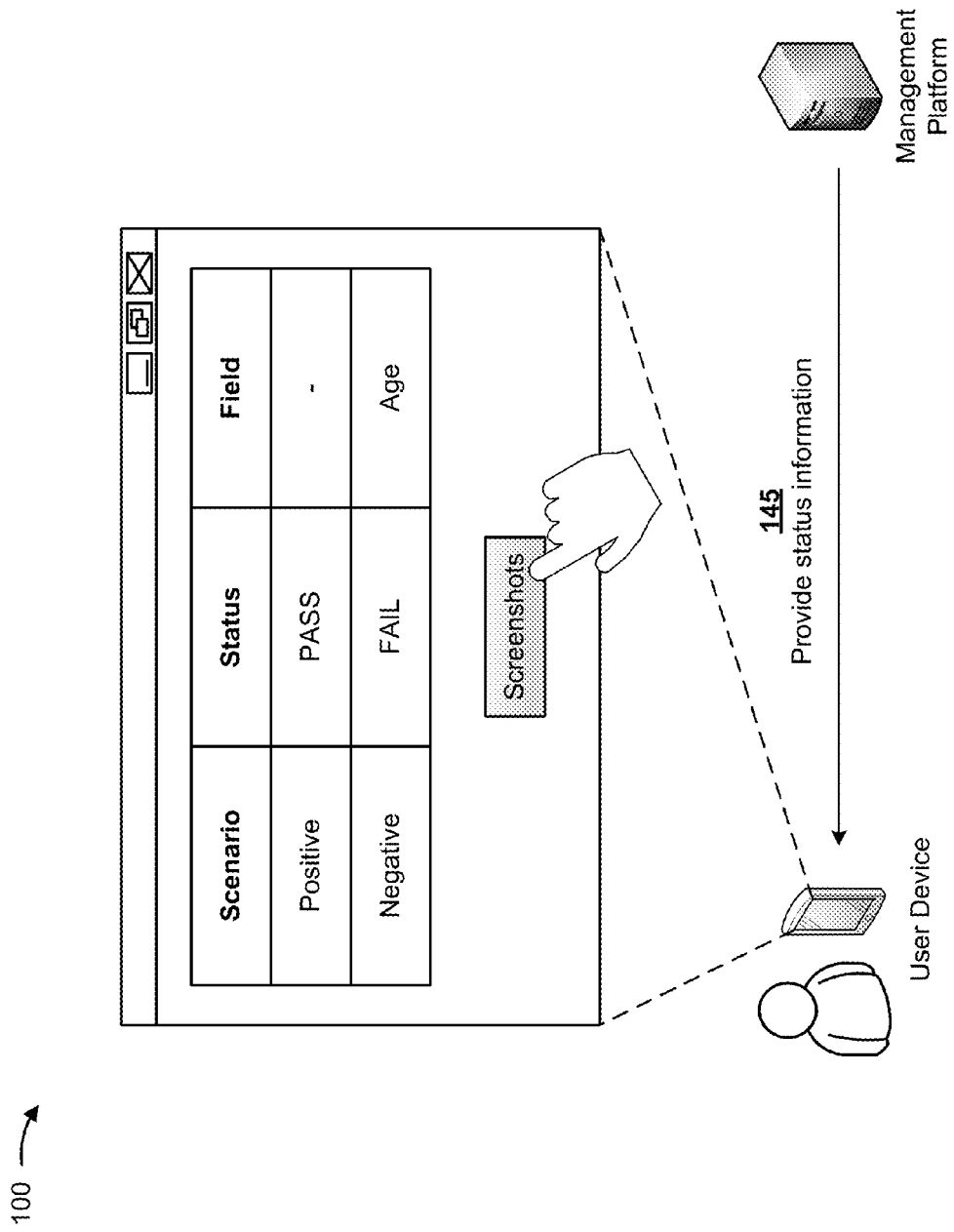

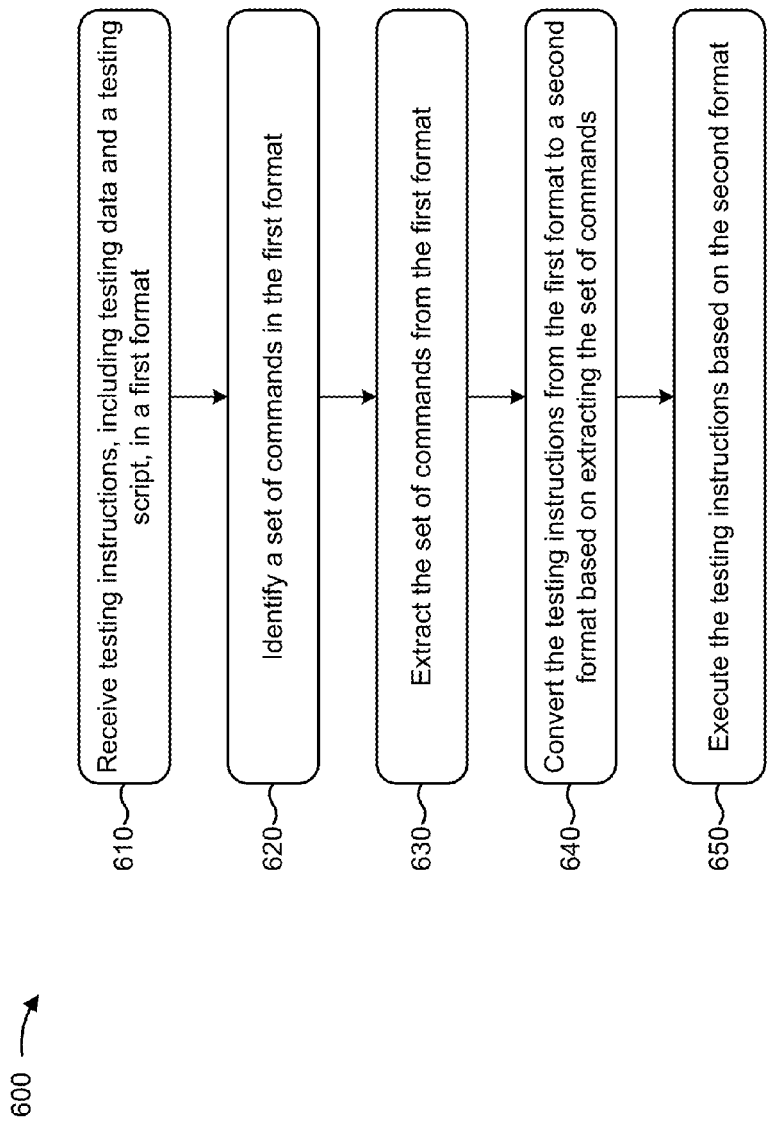

APPLICATION DEVELOPMENT MANAGEMENT

BACKGROUND

Application lifecycle management (ALM) of software programs may include requirements management, software architecture, computer programming, software testing, software maintenance, continuous integration, project management, and release management.

SUMMARY

In some possible implementations, a device may include one or more processors. The one or more processors may receive testing instructions, for testing a computer program product, in a first format. The testing instructions may include testing data and a testing script. The testing data and the testing script may be associated with the first format. The one or more processors may identify a set of commands in the first format. The one or more processors may extract the set of commands from the first format. The one or more processors may convert the testing instructions from the first format to a second format based on extracting the set of commands. The one or more processors may execute the testing instructions based on the second format.

In some possible implementations, a non-transitory computer readable medium may store instructions. The instructions may cause a processor to receive testing instructions, for testing a computer program product, in a first format. The testing instructions may include testing data and a testing script. The testing data and the testing script may be associated with the first format. The instructions may cause the processor to identify a set of commands in the first format. The instructions may cause the processor to extract the set of commands from the first format. The instructions may cause the processor to convert the testing instructions from the first format to a second format based on extracting the set of commands. The instructions may cause the processor to execute the testing instructions based on the second format.

In some possible implementations, a method may include receiving, by a device, testing instructions, for testing a computer program product, in a first format. The testing instructions may include testing data and a testing script. The testing data and the testing script may be associated with the first format. The method may include identifying, by the device, a set of commands in the first format. The method may include extracting, by the device, the set of commands from the first format. The method may include converting, by the device, the testing instructions from the first format to a second format based on extracting the set of commands. The method may include executing, by the device, the testing instructions based on the second format.

BRIEF DESCRIPTION OF THE DRAWINGS

FIG. 6 is a flow chart of an example process for converting testing instructions from a first format into a second format and executing the testing instructions.

DETAILED DESCRIPTION

The following detailed description of example implementations refers to the accompanying drawings. The same reference numbers in different drawings may identify the same or similar elements.

The software development lifecycle may include aggregating system requirements, translating the system requirements into source code (e.g., stubs, configurations, etc.), performing a test (e.g., a regression test) based on the source code, and deploying the software. In some cases, one or more stages of the lifecycle may involve multiple entities (e.g., developers) that may include different programming acumen (e.g., knowledge of programming languages, etc.), may include different sets of entities involved with various stages, or the like. As such, issues such as code errors, inconsistent code quality, etc. may exist. Additionally, a developer may be unaware of other developers' activities during the development process, thereby resulting in redundant efforts, version control errors, or the like.

Implementations described herein may enable a management platform to automatically generate code (e.g., stubs, configurations, etc.) based on a resource (e.g., a file), perform a code analysis based on the generated code, automatically perform a test based on another resource (e.g., another file), and provide the code to a production environment of an application device (e.g., a cloud application device). Additionally, implementations described herein enable the management platform to provide, to a user device, status information that identifies a status of a project (e.g., development of an application). In this way, the user device may provide, for display via a user interface (e.g., a dashboard), information that enables a user (e.g., a developer) to understand a particular status of the project.

Implementations described herein may enable the management platform to automatically generate code based on a resource and a code template, thereby reducing an amount of manual generation of code (e.g., code written by a developer) and errors associated with manual generation of code, thereby conserving processor and/or memory resources of computing devices associated with software development. Additionally, implementations described herein enable the management platform to automatically perform testing without requiring that a user write test scripts using a particular programming language, thereby reducing an amount of manual generation of test scripts and associated errors. In this way, implementations described herein may conserve processor and/or memory resources of computing devices associated with application development.

Figure 1A:
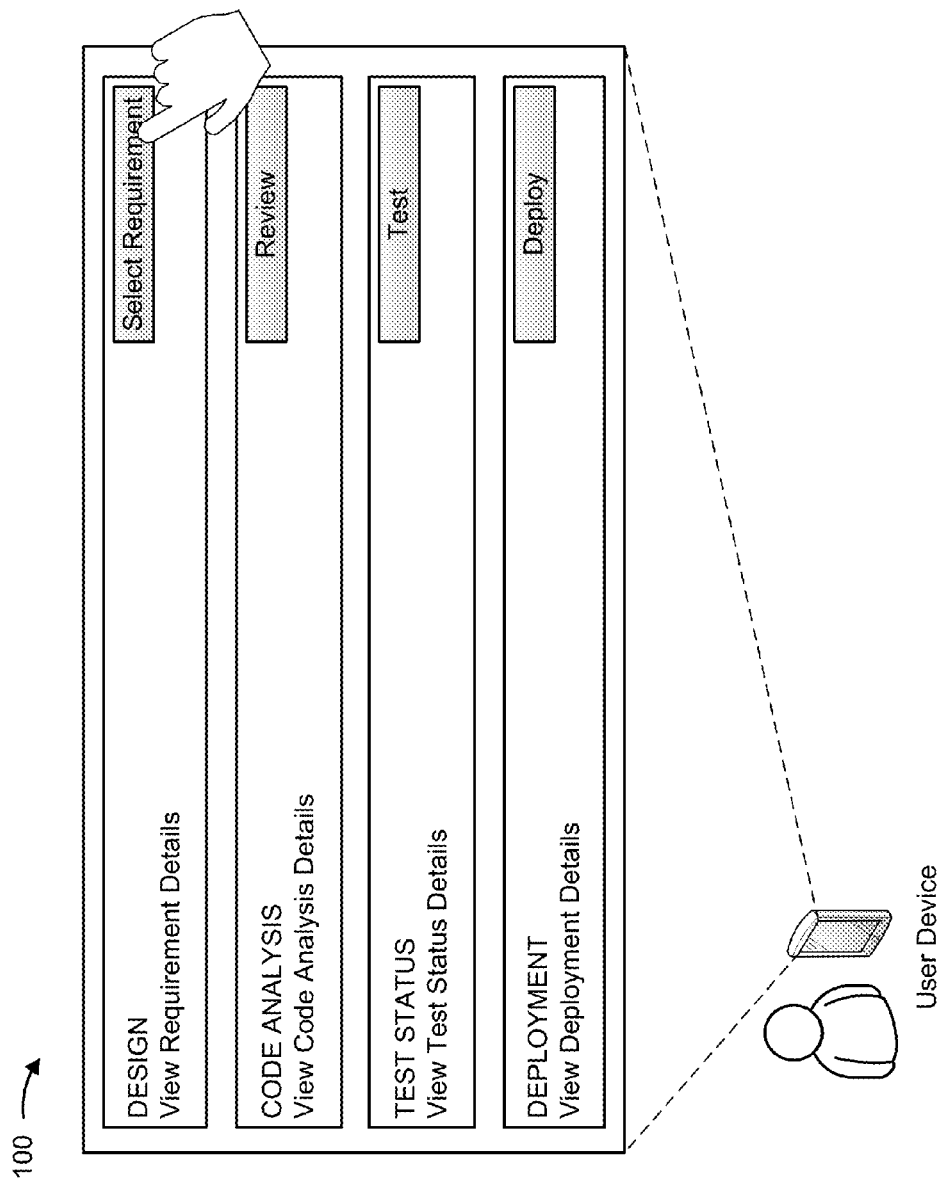
FIGS. 1A-1O are diagrams of an overview of an example implementation described herein.
Figure 1B:
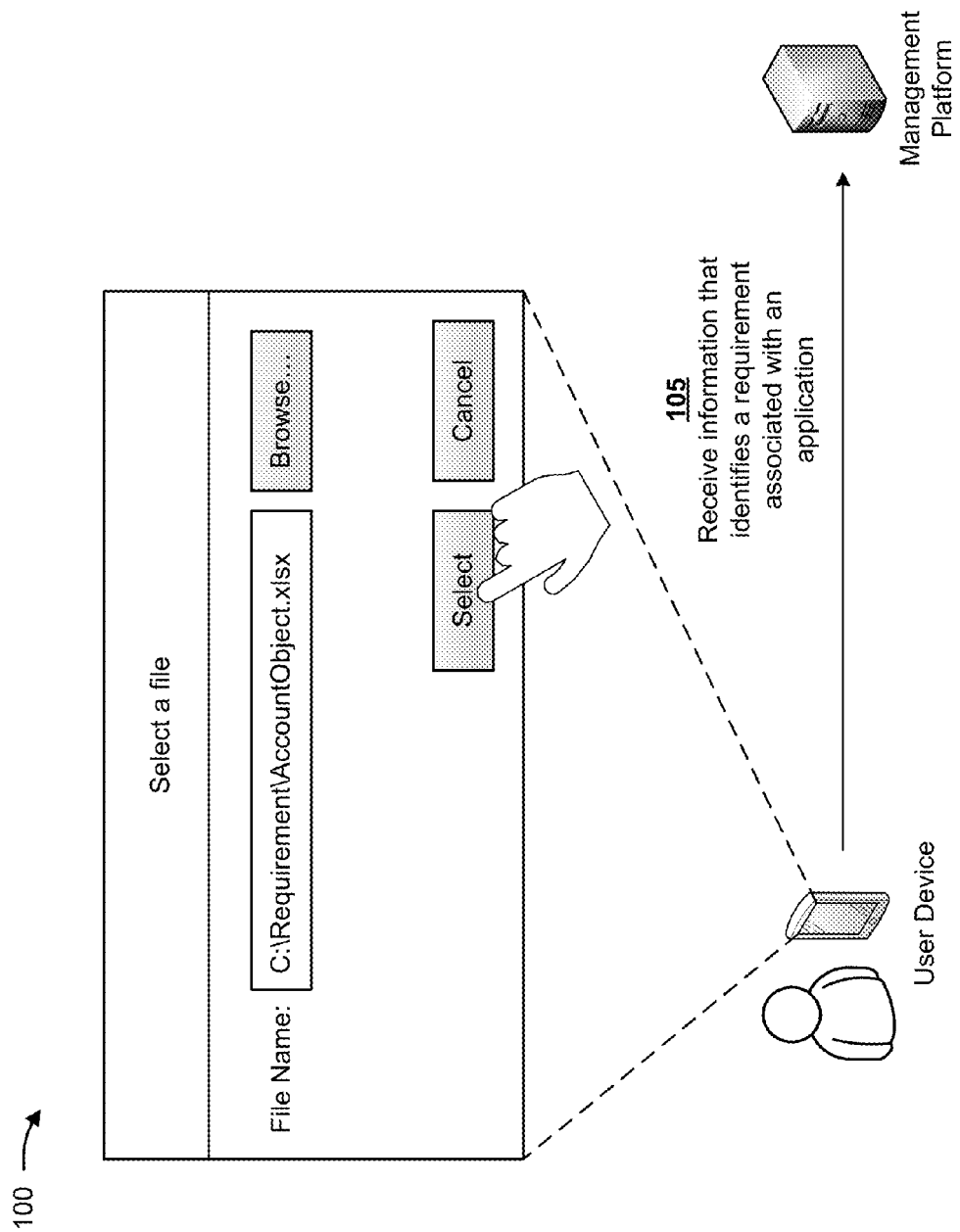

FIGS. 1A-1O are diagrams of an overview of an example implementation 100 described herein. As shown in FIG. 1A, a user device may receive an input that identifies an action associated with development of an application. For example, the user device may provide, for display via a user interface (e.g., a dashboard), information associated with a project. For example, the project may include development of the application. As shown, assume that a user interacts with a user interface element of the user device (e.g., "Select Requirement"). As shown in FIG. 1B, assume that the user selects a particular resource (e.g., a file labeled "AccountObject.xlsx"). As shown by reference number 105, a management platform (e.g., a cloud computing device) may receive information that identifies a requirement associated with an application. For example, the management platform may receive the resource selected by the user.

Figure 1C:
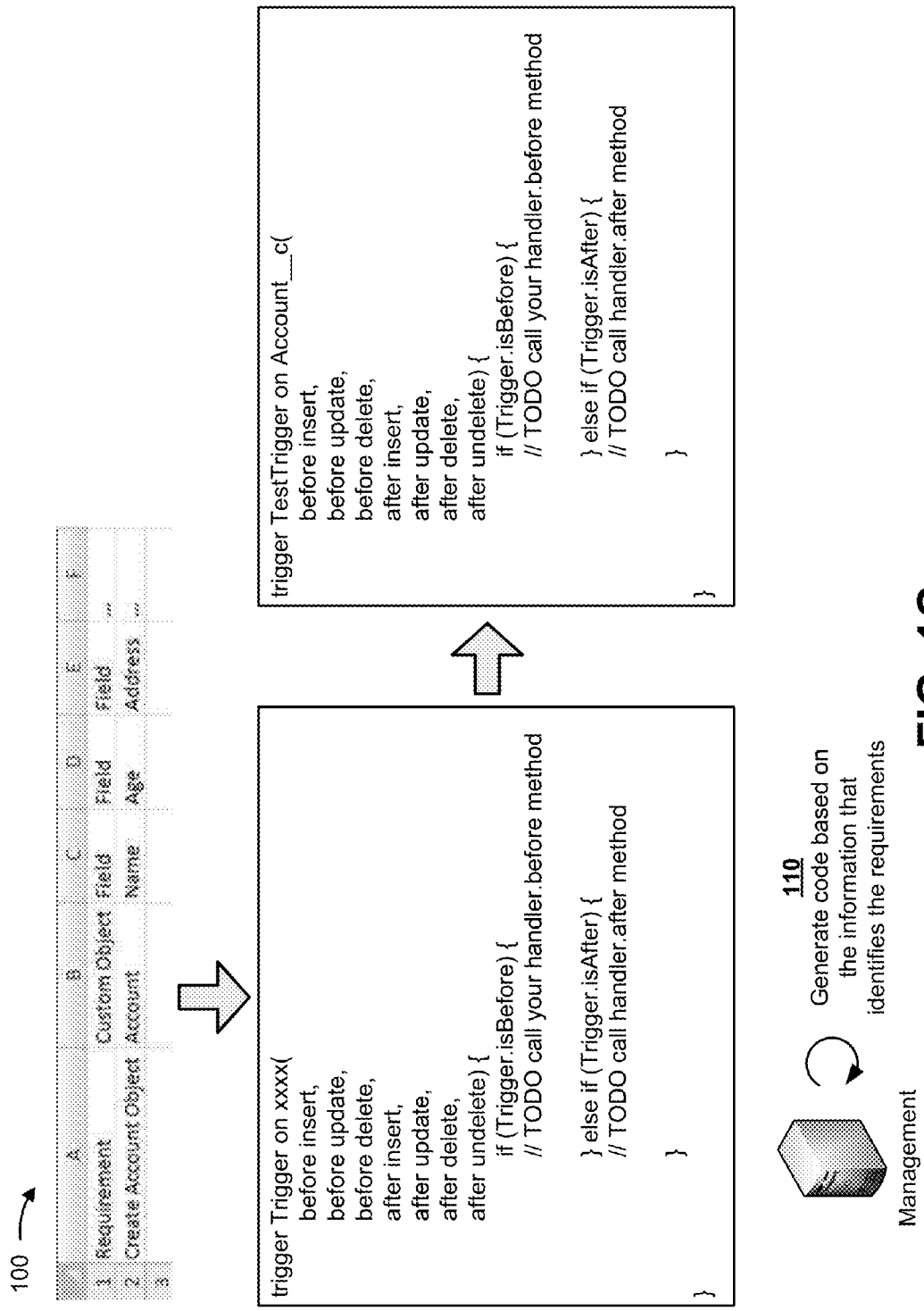

As shown in FIG. 1C, and by reference number 110, the management platform may generate code (e.g., stubs, configurations, etc.) based on the information that identifies the requirement. For example, assume that the user (e.g., a developer) desires to modify an application (e.g., a customer relationship management (CRM) application) to include additional functionality. Further, assume that the user desires to generate code associated with an object (e.g., a data structure that stores information), a trigger (e.g., code that executes based on database manipulation language (DML) calls, such as insert, update, delete, merge, upset, undelete, etc.), and/or a class (e.g., code that provides particular functionality based on the object). In this case, the user may input particular values into fields associated with the file (e.g., the resource).

For example, as shown, the user may input, into the file, a name of the object to be created (e.g., "Account"), may input names associated with fields of the object (e.g., "Name," "Age," "Address," etc.). As an example, assume that the user desires to create an object that stores information (e.g., a name, an address, an age, etc.) associated with an entity (e.g., a user, a customer, etc.). Additionally, assume that the user desires to create an application that provides particular business logic (e.g., determines if an age of a user satisfies a threshold, or the like).

As an example, the management platform may identify particular code components to be generated based on the file. For example, a code component may include code associated with a particular functionality of the application. In this case, the management platform may identify a first code component (e.g., an object), a second code component (e.g., a trigger), and a third code component (e.g., a class) to be generated based on the file. For example, the file may include particular sections (e.g., sheets, fields, or the like) that may be associated with particular code components. Based on input values associated with the file (e.g., corresponding to the particular sections), the management platform may identify particular code components to be generated (e.g., based on parsing the file).

In some implementations, the management platform may identify code templates associated with the code components. For example, a code template may include generic code that may be used to generate unique code (e.g., specific code associated with an application). For example, as shown, the management platform may identify a code template associated with a trigger. In some implementations, the management platform may generate code based on a code template and one or more values associated with the file. For example, as shown, the management platform may populate particular fields of the code template with values specified in the input file. For example, for the code template associated with the trigger, the management platform may identify a particular portion of the code template that maps to a particular value associated with the file. As shown, the management platform may populate a particular portion of the code template (e.g., "Trigger on xxxx") with a particular value of the file (e.g., an object name, such as "Account c"). While not shown, the management platform may generate code for the other code components in a similar manner.

Figure 1D:
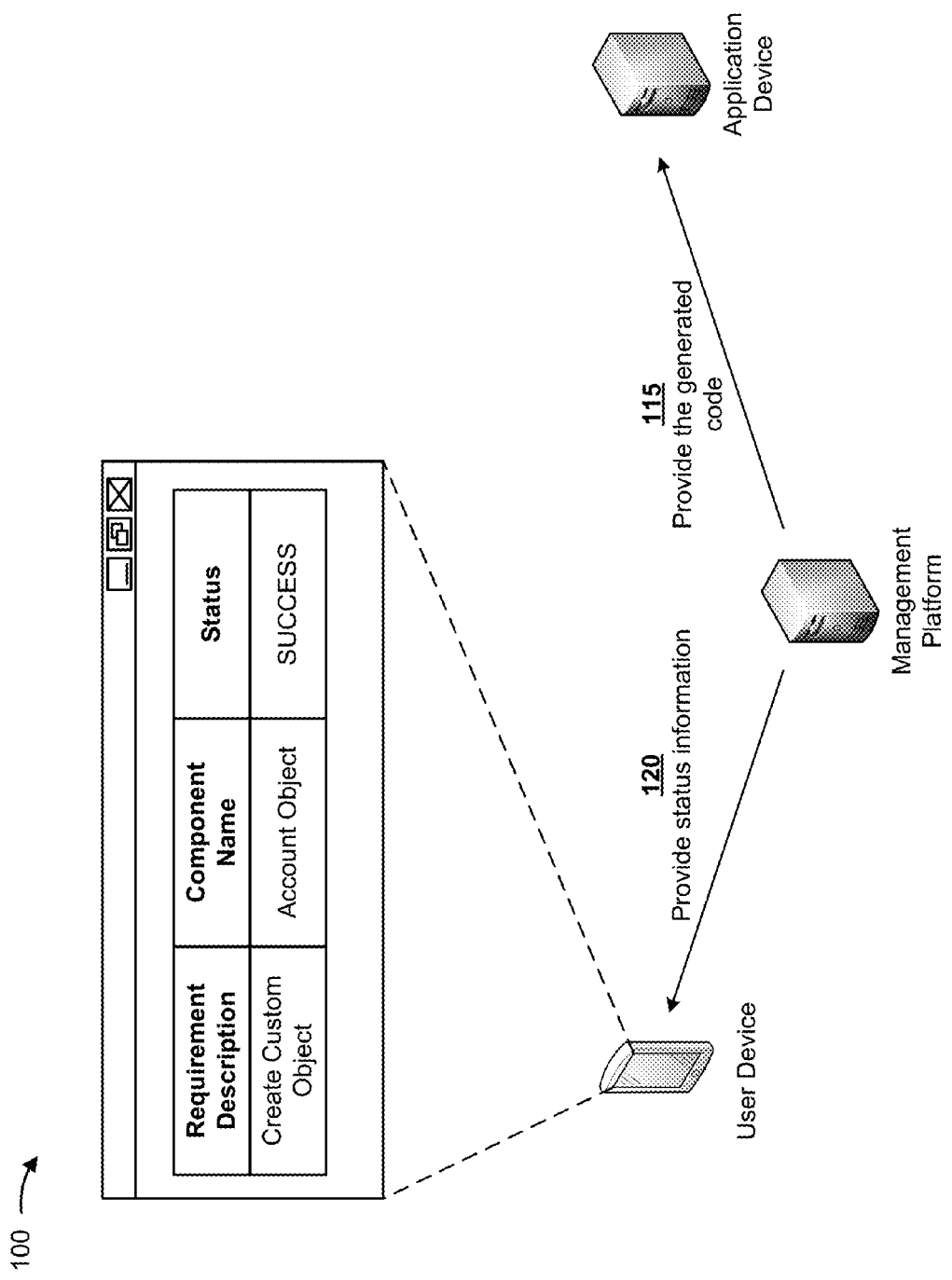

As shown in FIG. 1D, and by reference number 115, the management platform may provide the generated code to an application device (e.g., a server device that may execute the application). For example, the management platform may provide one or more files including the generated code to the application device (e.g., to a development environment associated with the application device). In some implementations, a user device may access the generated code (e.g., via a development console) and may modify the generated code associated with the development environment. As shown by reference number 120, the management platform may provide, to the user device, status information. For example, the status information may identify a particular status of the development of the application. As an example, the status information may identify that the management platform successfully generated code based on the input file.

Figure 1E:
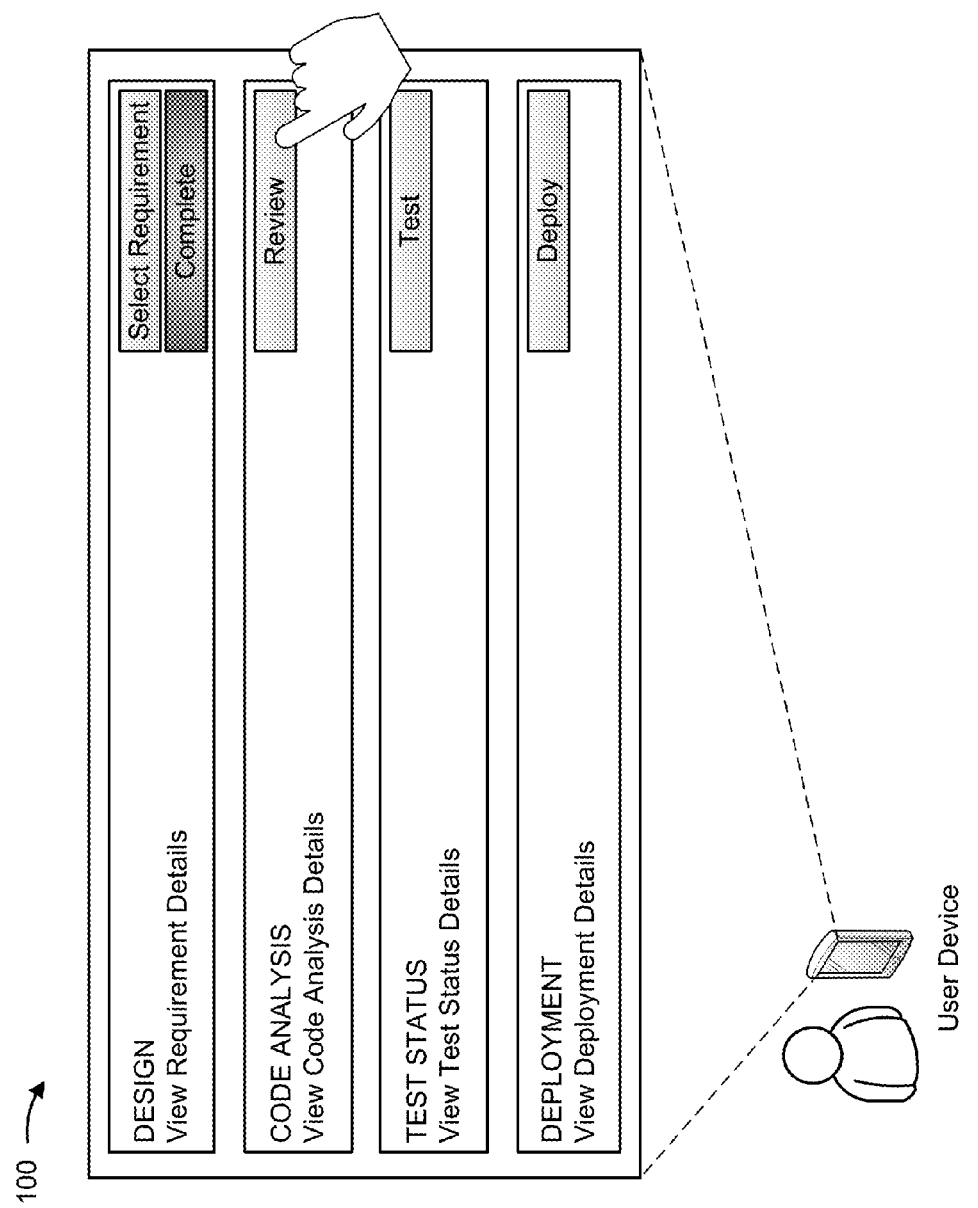

As shown in FIG. 1E, the user device may provide, for display, information associated with the project (e.g., based on the status information). For example, as shown, the user device may provide, for display, information that identifies that code was generated based on the input file. Additionally, as shown in FIG. 1E, assume that the user interacts with another user interface element (e.g., "Review").

Figure 1F:
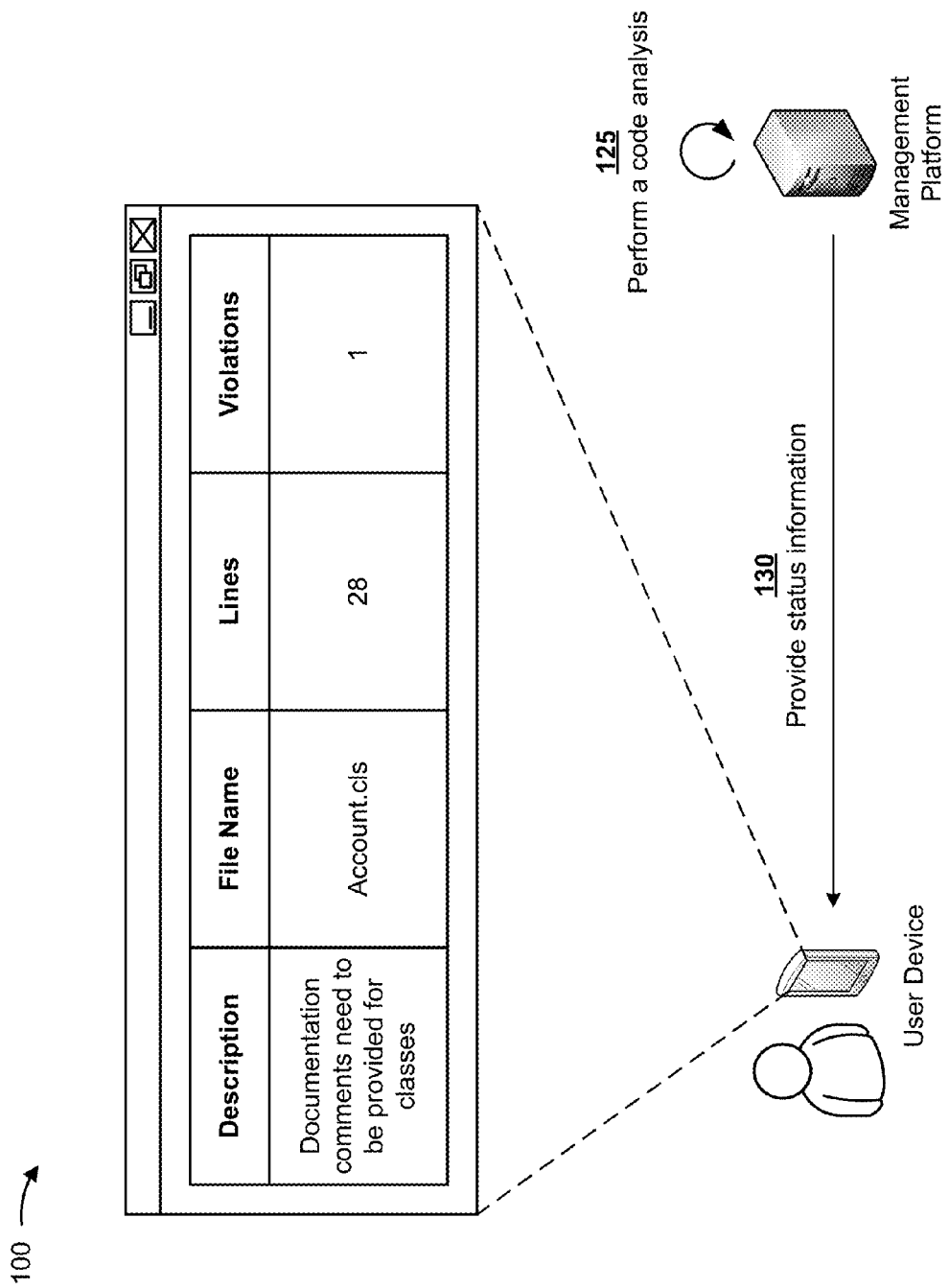

As shown in FIG. 1F, and by reference number 125, the management platform may perform a code analysis. For example, the management platform may perform the code analysis based on receiving information associated with the user interaction with the user interface element (e.g., "Review"). In some implementations, a user (e.g., a developer) may modify the generated code (e.g., may add to the code, may revise the code, etc.). Additionally, or alternatively, the management platform may receive the code (e.g., a file including the generated code, the modified code, etc.) from the application device, and may perform a code analysis. For example, the management platform may parse the code and may identify particular issues associated with the code (e.g., may determine whether the code adheres to or violates a particular standard, or the like). As shown by reference number 130, the management platform may provide status information to the user device. Additionally, as shown, the user device may provide, for display, information associated with the code analysis. For example, assume that the management platform identifies a particular issue with the code (e.g., that comments were not provided, that a function call identifies an incorrect location, that a line of code is inoperable, or the like).

Figure 1G:
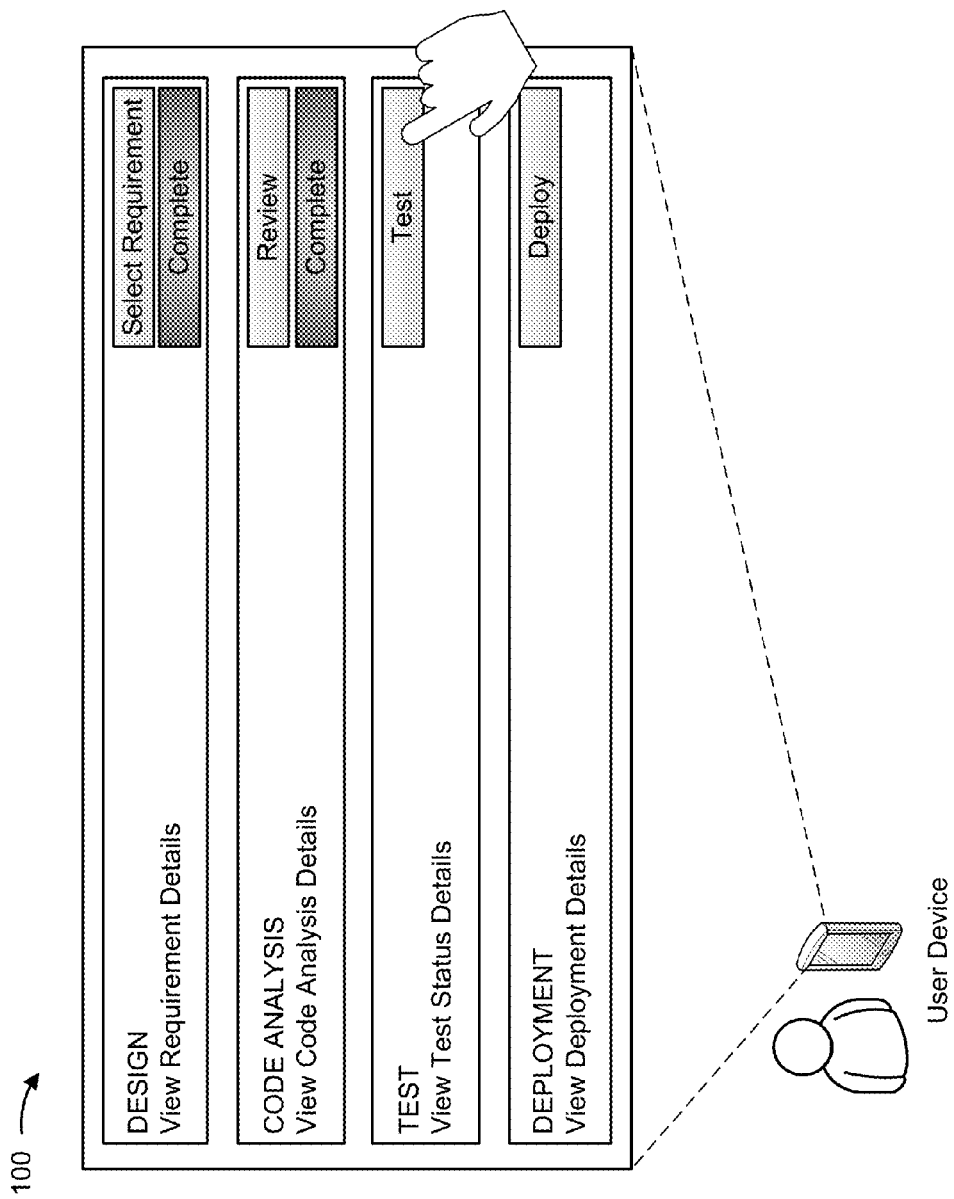

As shown in FIG. 1G, the user device may provide, for display, information associated with the project (e.g., based on the status information). For example, as shown, the user device may provide, for display, information that identifies that the code analysis is complete. Additionally, as shown in FIG. 1G, assume that the user interacts with another user interface element (e.g., "Test").

As shown in FIG. 1H, assume that a user interacts with the user device and selects a particular resource (e.g., a file "Test.xlsx"), and interacts with a user interface element ("Select"). As shown by reference number 135, the management platform may receive information associated with a test (e.g., a regression test). For example, the information associated with the test may include a resource (e.g., the file). In some implementations, the test may be used to determine whether code (e.g., the generated code) associated with an application under test (AUT) implements a particular functionality correctly and/or that the code does not negatively affect other functionalities of the AUT.

Figure 1I:
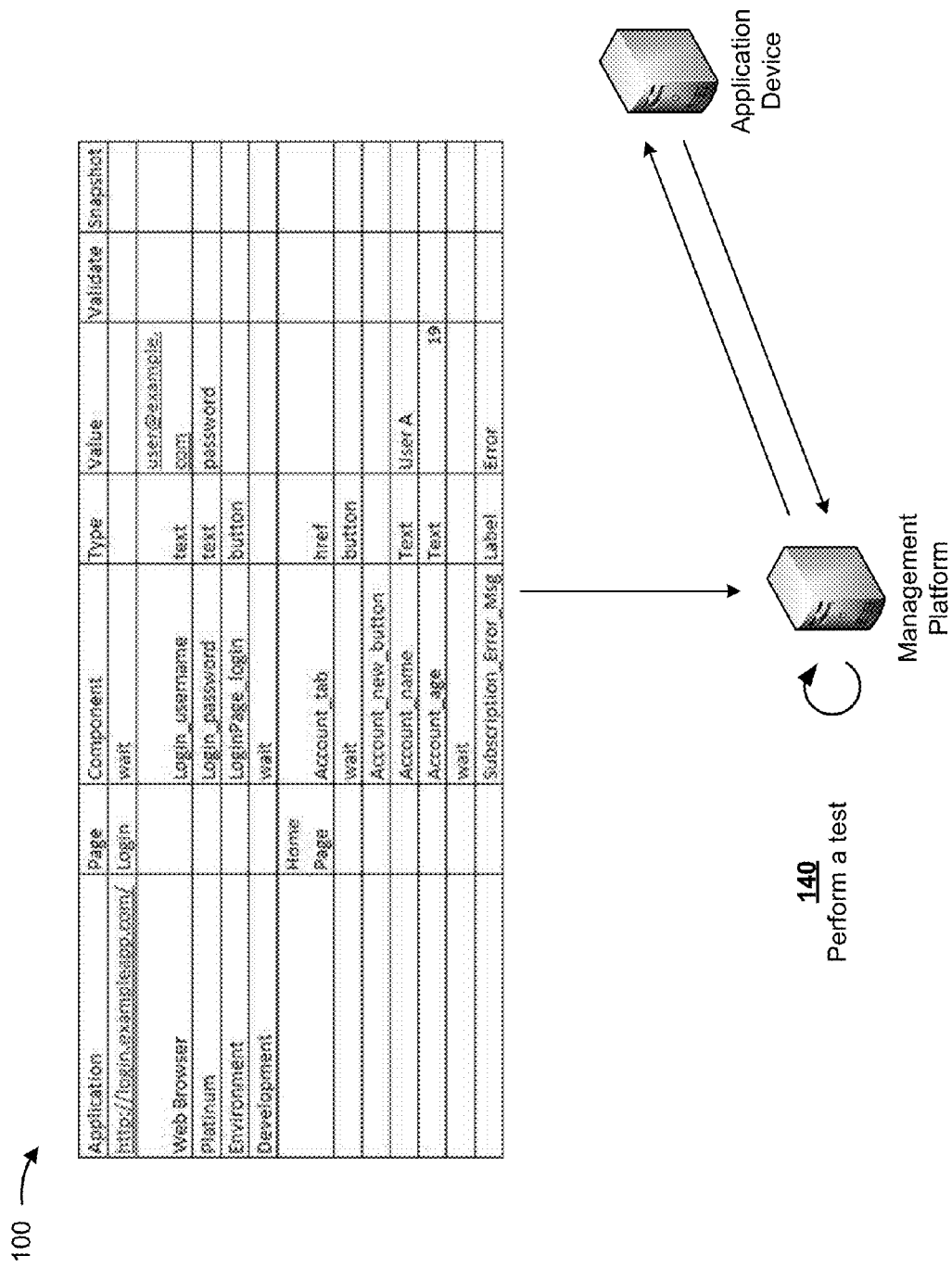

As shown in FIG. 1I, and by reference number 140, the management platform may perform a test. For example, the management platform may parse the file, may identify particular instructions based on parsing the file, and may provide particular inputs to the AUT based on the instructions.

For example, as shown, the file may include a test script. In some implementations, a test script may include a set of instructions that may be used to test the AUT. For example, as shown, the file may include values identifying, among other things, a uniform resource locator (URL) associated with the AUT, a particular web browser to be used to test the AUT, and an environment associated with the application device. Additionally, the file may include values associated with particular instructions associated with particular webpages associated with the AUT, and particular user interface elements associated with the webpages (e.g., text boxes, buttons, tabs, etc.). Additionally, the file may include instructions regarding whether to validate a particular input (e.g., determine whether an output associated with the AUT matches a particular value), and/or whether to capture a screenshot of an output of the AUT.

In some implementations, the management platform may identify particular instructions based on particular values associated with particular fields of the file. Additionally, the management platform may determine corresponding inputs to the AUT, and may provide the particular inputs to the AUT. In some implementations, the file may include one or more test cases. A test case may be associated with a particular set of input values that may cause the AUT to generate a particular output value (or values) (e.g., an actual result). For example, the management platform may access the application (e.g., using the URL), and may input particular values in association with particular webpages. For example, for a particular test case, the management platform may input a value associated with an account name (e.g., "User A"), and a value associated with an age (e.g., "19").

As shown in FIG. 1J, and by reference number 145, the management platform may provide status information to the user device based on a result of the test. For example, the user device may provide, for display, information associated with the project (e.g., based on the status information). For example, as shown, the user device may provide, for display, information that identifies multiple test cases. As shown, the user device may provide, for display, information that identifies that a first test case (e.g., "Positive") is associated with a particular designation (e.g., "PASS"). For example, the management platform may compare an actual result of the test case and an expected result of the test case, and may determine a designation associated with the test case. Additionally, as shown, the user device may provide, for display, information that identifies that a second test case (e.g., "Negative") is associated with a particular designation (e.g., "FAIL"). For example, a fail designation may indicate that an actual result of the test case did not match an expected result. Additionally, the user device may provide, for display, information that identifies a particular field that may have generated the failure. As shown, assume that a user interacts with a particular user interface element ("Screenshots").

Figure 1K:
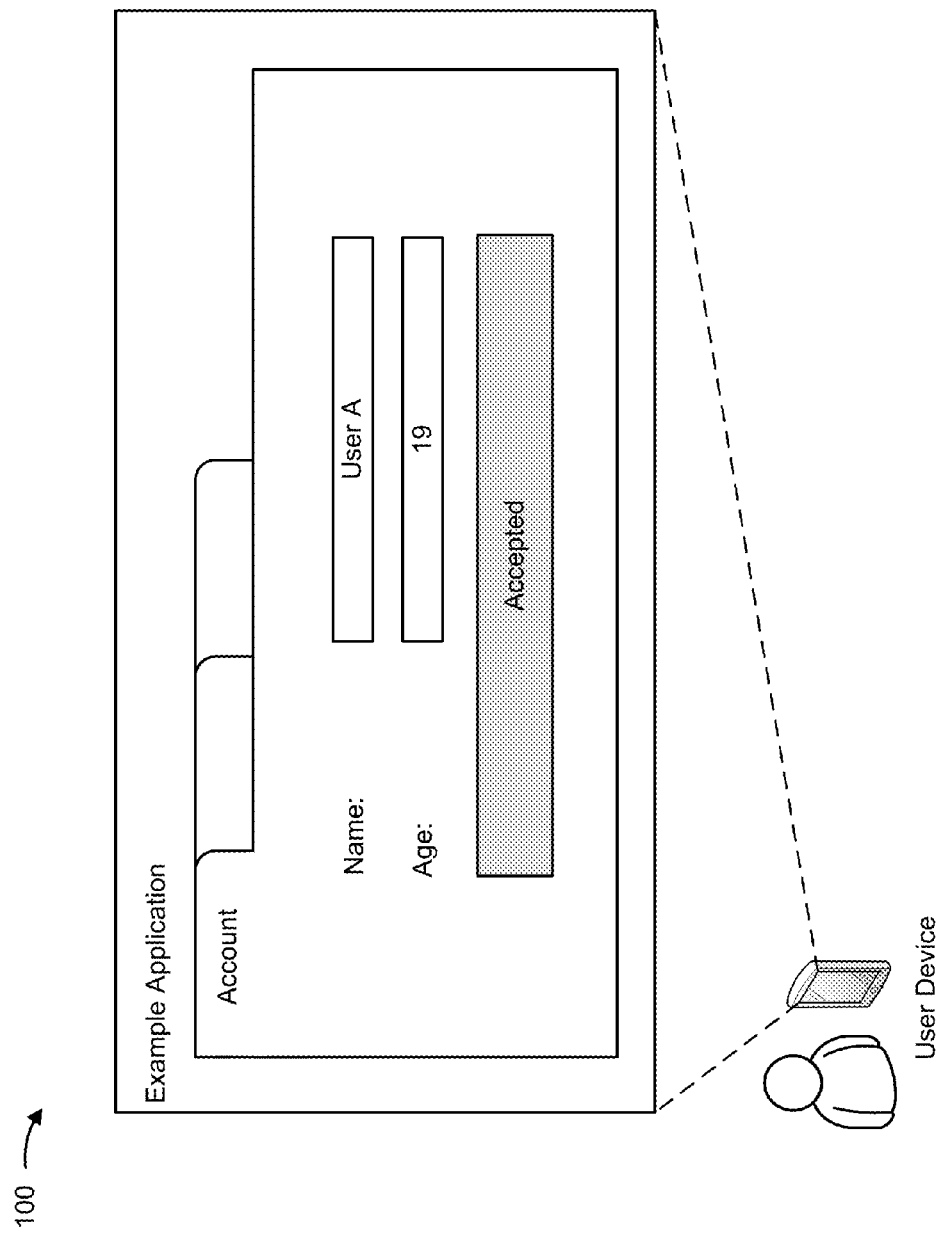

As shown in FIG. 1K, the user device may provide, for display, information associated with a screenshot. For example, the management platform may capture information associated with the screenshot based on performing the test, and may provide the information associated with the screenshot to the user device. As shown, the screenshot may represent an output of the AUT. For example, as shown, the AUT may have generated a particular output (e.g., "Accepted") based on an input value for a user name and an input value for an age. For example, the AUT may have been expected to generate another output value (e.g., an error) based on the age value not satisfying the threshold. In this way, a user may interact with the user device to determine particular results of the test, and may modify the code based on the results.

Figure 1L:
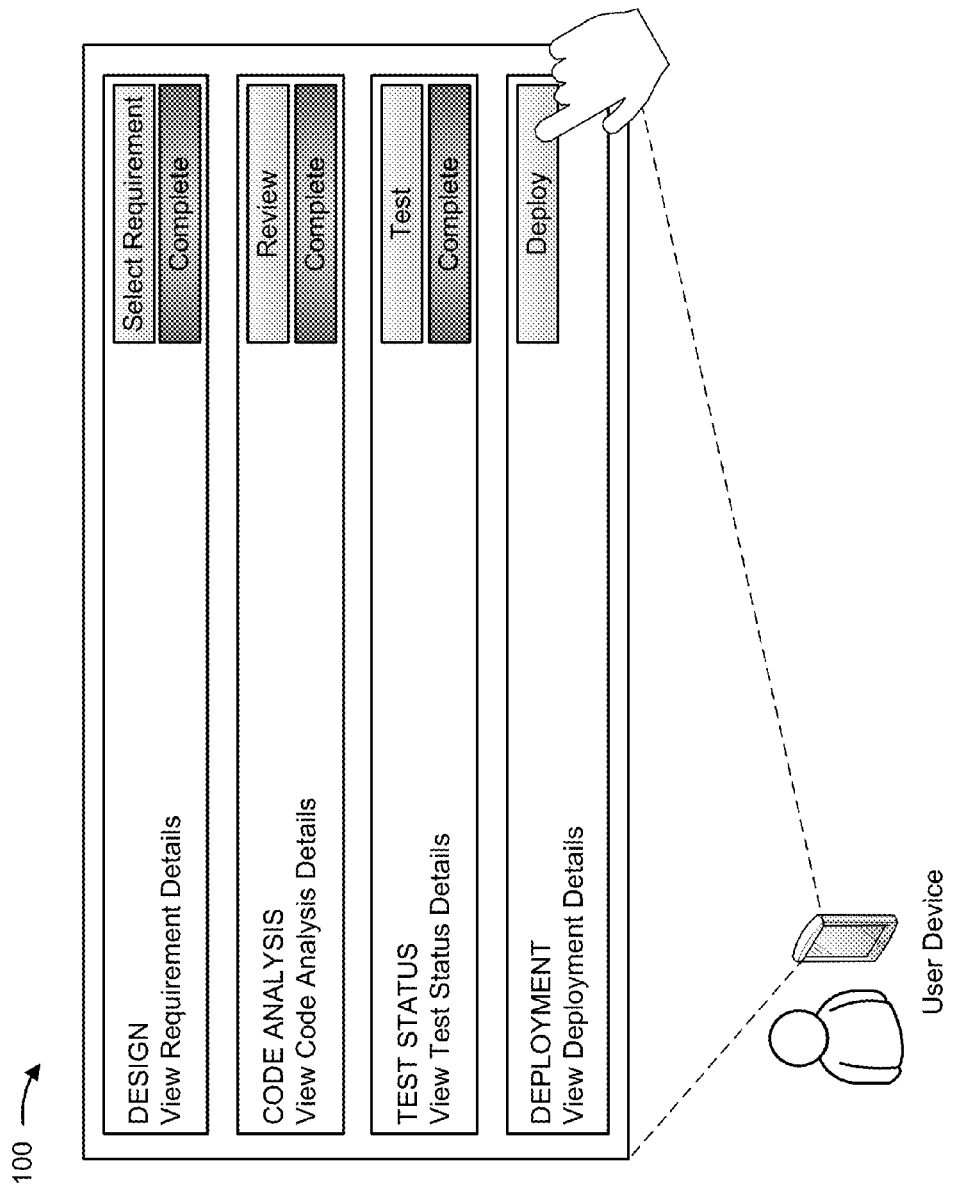

As shown in FIG. 1L, the user device may provide, for display, information associated with the project (e.g., based on the status information). For example, as shown, the user device may provide, for display, information that identifies that testing is complete. Additionally, as shown in FIG. 1L, assume that the user interacts with another user interface element (e.g., "Deploy").

Figure 1M:
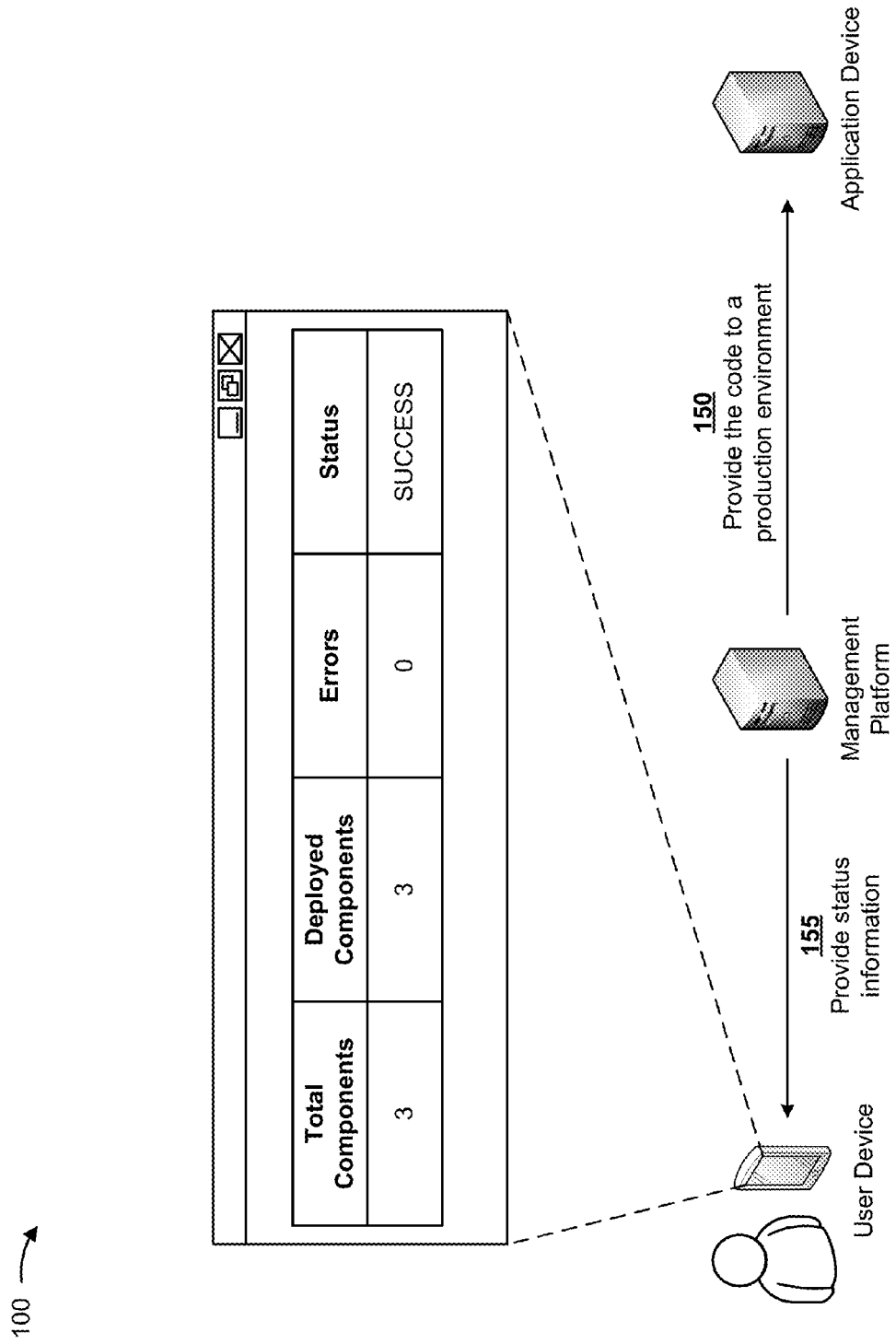

As shown in FIG. 1M, and by reference number 150, the management platform may provide the code to a production environment of the application device (e.g., may deploy the software program). For example, a production environment may include a controlled environment at which the application is available for use by an entity, such as customer, a subscriber, a user, etc. As shown by reference number 155, the management platform may provide status information to the user device. As shown, the user device may provide, for display, information associated with the deployment, such as a status of the deployment, a quantity of deployed components, a quantity of errors encountered, etc.

Figure 1N:
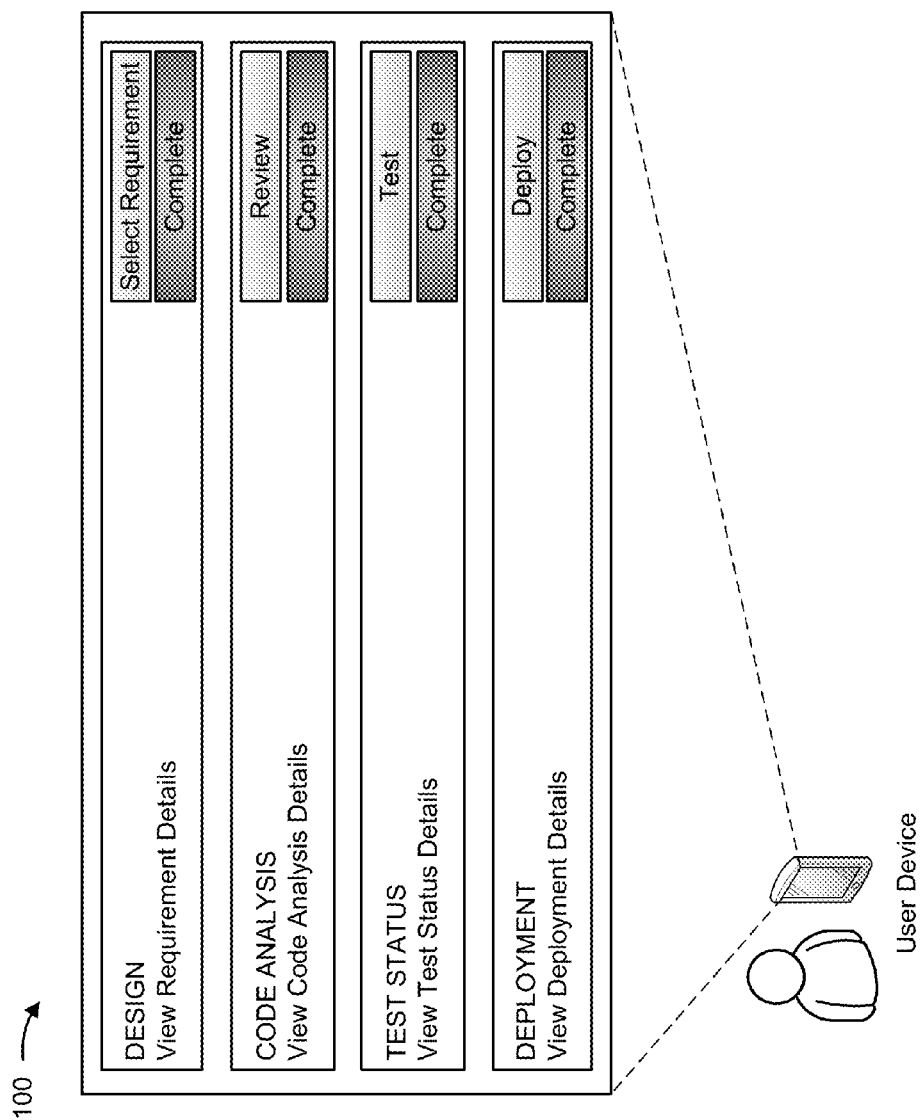
Figure 10:
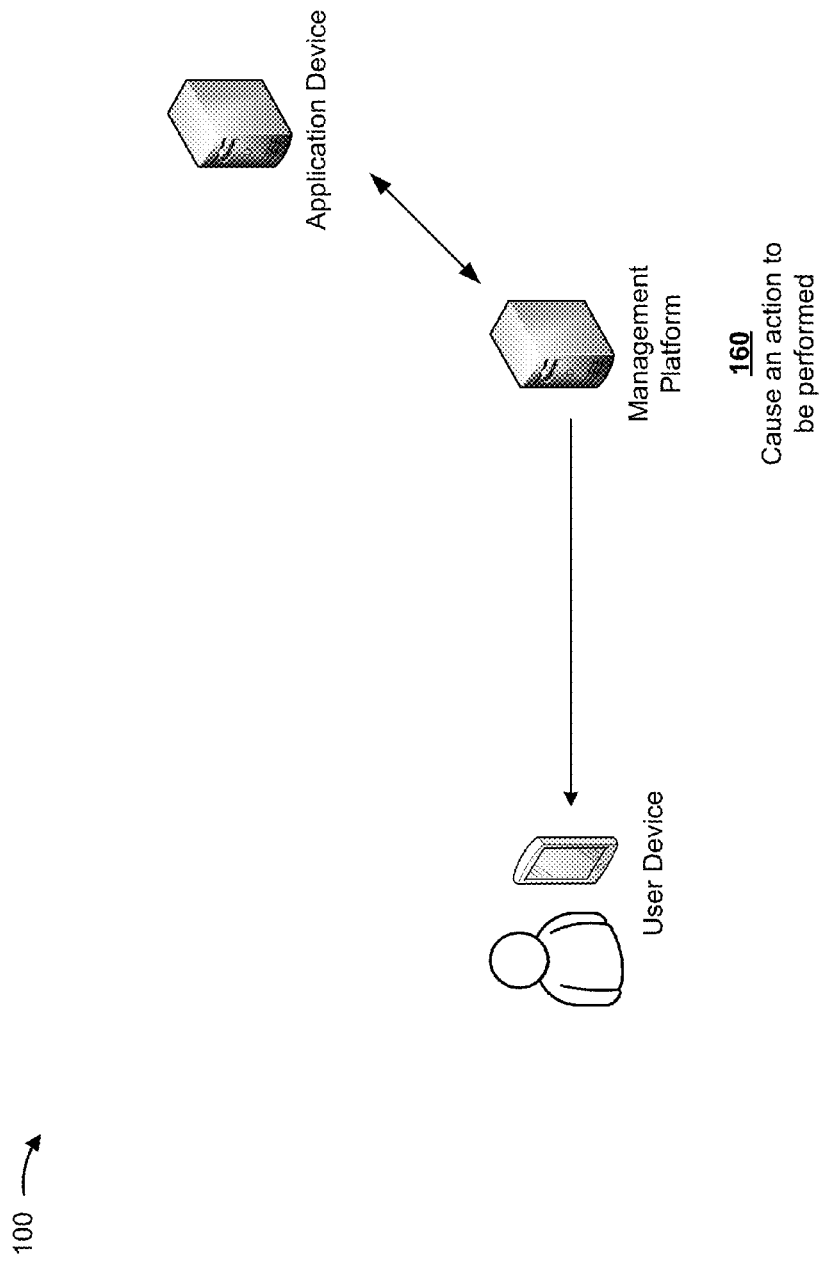

As shown in FIG. 1N, the user device may provide, for display, information associated with the project (e.g., based on the status information). For example, as shown, the user device may provide, for display, information that identifies that the code has been deployed.

As shown in FIG. 1O, and by reference number 160, the management platform cause an action to be performed. For example, as shown, the management platform may automatically orchestrate additional testing, automatically perform a debugging process of the application, automatically analyze code associated with the application and suggest a particular correction, automatically identify code associated with a potential defect, or the like.

In this way, implementations described herein enable the management platform to receive resources and automatically generate code and perform a test based on the code. In this way, implementations described herein may conserve processor and/or memory resources of computing devices by reducing a quantity of manual code generation and/or manual test script generation.

While implementations described herein are associated with a CRM application and/or particular code components associated with a CRM application, other implementations may be associated with other types of applications and/or other types of code components. In other words, reference to a CRM application and/or particular code components associated with a CRM application are provided simply for explanatory purposes.

As indicated above, FIGS. 1A-1O are provided merely as an example. Other examples are possible and may differ from what was described with regard to FIGS. 1A-1O.

Figure 2:
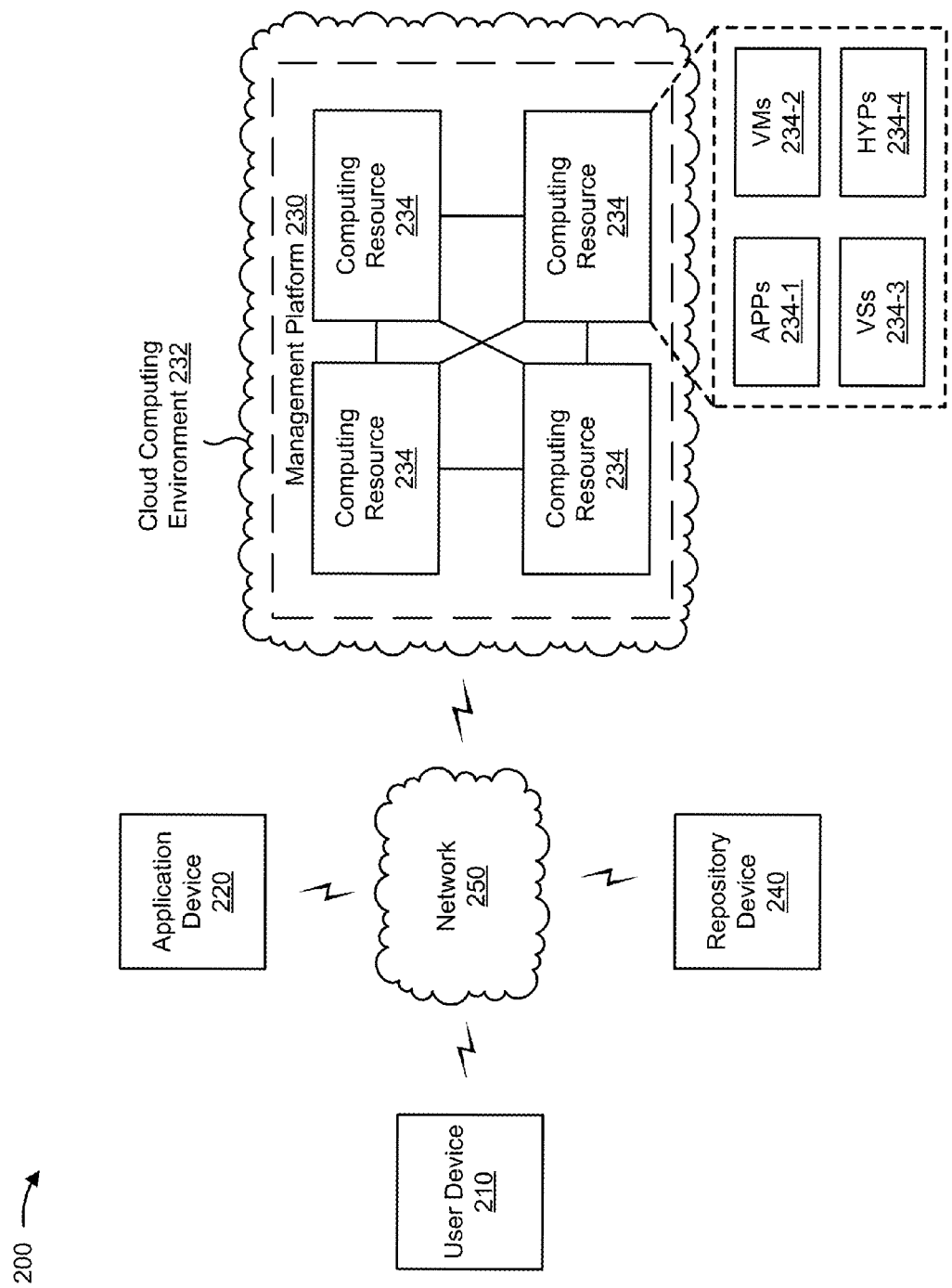
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an application device 220, a management platform 230, a repository device 240, and a network 250. Devices of environment 200 may interconnect via wired connections, wireless connections, or a combination of wired and wireless connections.

User device 210 includes one or more devices capable of receiving, generating, storing, processing, and/or providing information associated with a software development project. For example, user device 210 may include a computing device (e.g., a desktop computer, a laptop computer, a tablet computer, a handheld computer, a server, etc.), a mobile phone (e.g., a smart phone, a radiotelephone, etc.), a wearable device (e.g., a pair of smart glasses or a smart watch), or a similar device.

Application device 220 includes one or more devices capable of receiving, storing, and/or providing information associated with an application. For example, application device 220 may include a server or a group of servers (e.g., a cloud-based server, an application device, a content server, a host server, a web server, a database server, etc.), a desktop computer, or a similar device.

Management platform 230 includes one or more devices capable of receiving information that identifies a requirement associated with an application, generating code based on the information, performing a code analysis, receiving information associated with performing a test (e.g., a regression test, a characterization test, a quality control test, a confidence test (e.g., a "smoke" test), a test-driven development test, a user acceptance test, or the like), and performing the test, as described elsewhere herein. In some implementations, management platform 230 may be designed to be modular such that certain software components can be swapped in or out depending on a particular need. As such, management platform 230 may be easily and/or quickly reconfigured for different uses. In some implementations, management platform 230 may provide information, for display, via an output component.

In some implementations, as shown, management platform 230 may be hosted in cloud computing environment 232. Notably, while implementations described herein describe management platform 230 as being hosted in cloud computing environment 232, in some implementations, management platform 230 may not be cloud-based (i.e., may be implemented outside of a cloud computing environment) or may be partially cloud-based.

Cloud computing environment 232 includes an environment that hosts management platform 230. Cloud computing environment 232 may provide computation, software, data access, storage, etc. services that do not require end-user (e.g., user device 210) knowledge of a physical location and configuration of system(s) and/or device(s) that hosts management platform 230. As shown, cloud computing environment 232 may include a group of computing resources 234 (referred to collectively as "computing resources 234" and individually as "computing resource 234").

Computing resource 234 includes one or more personal computers, workstation computers, server devices, or other types of computation and/or communication devices. In some implementations, computing resource 234 may host management platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 includes a group of cloud resources, such as one or more applications ("APPs") 234-1, one or more virtual machines ("VMs") 234-2, virtualized storage ("VSs") 234-3, one or more hypervisors ("HYPs") 234-4, or the like.

Application 234-1 includes one or more software applications that may be provided to or accessed by client device 205. Application 234-1 may eliminate a need to install and execute the software applications on client device 205. For example, application 234-1 may include software associated with management platform 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., client device 205), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 may provide hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Repository device 240 includes one or more devices capable of receiving, storing, and/or providing information associated with a software development project. For example, repository device 240 may include a server or a group of servers (e.g., a cloud-based server, an application device, a content server, a host server, a web server, a database server, etc.), a desktop computer, or a similar device.

Network 250 includes one or more wired and/or wireless networks. For example, network 250 may include a cellular network (e.g., a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
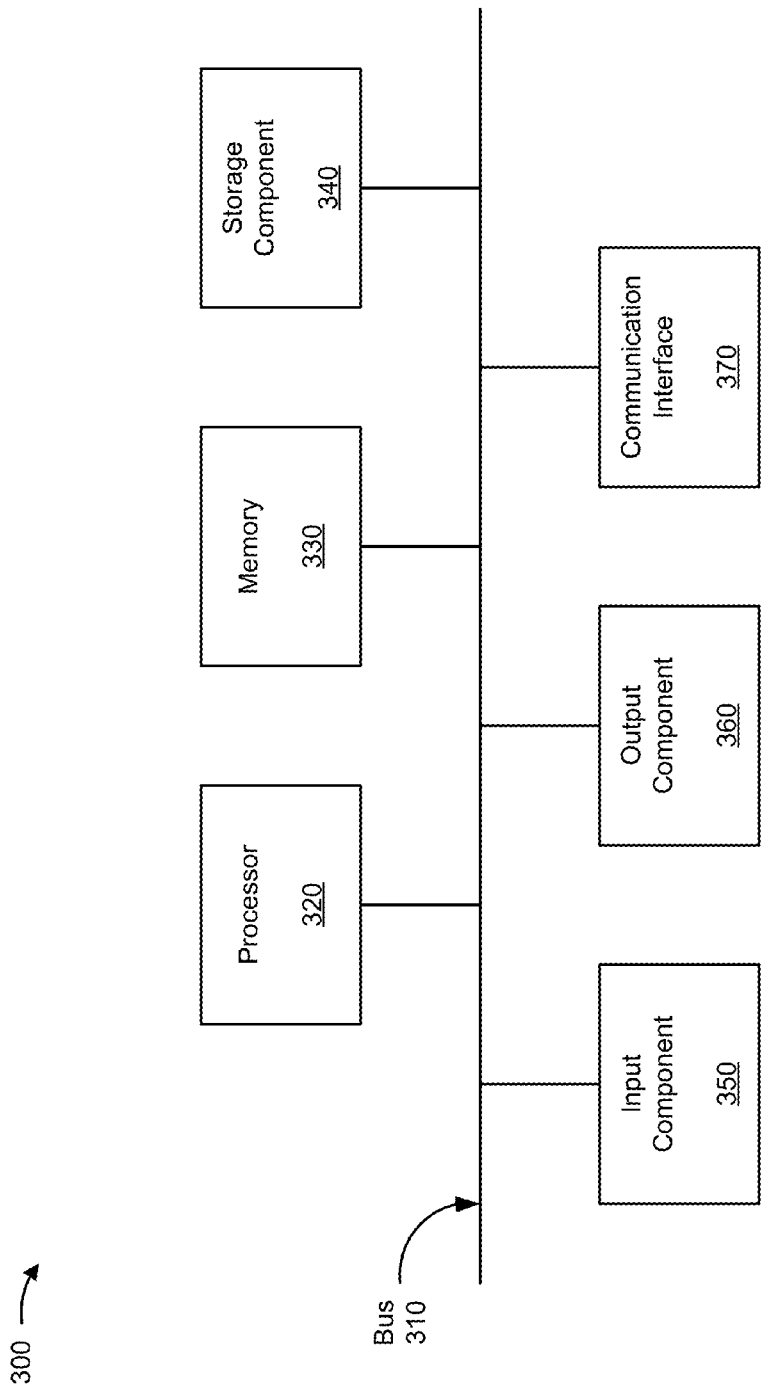
FIG. 3 is a diagram of example components of one or more devices of FIG. 2.

FIG. 3 is a diagram of example components of a device 300. Device 300 may correspond to user device 210, application device 220, management platform 230, and/or repository device 240. In some implementations, user device 210, application device 220, management platform 230, and/or repository device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
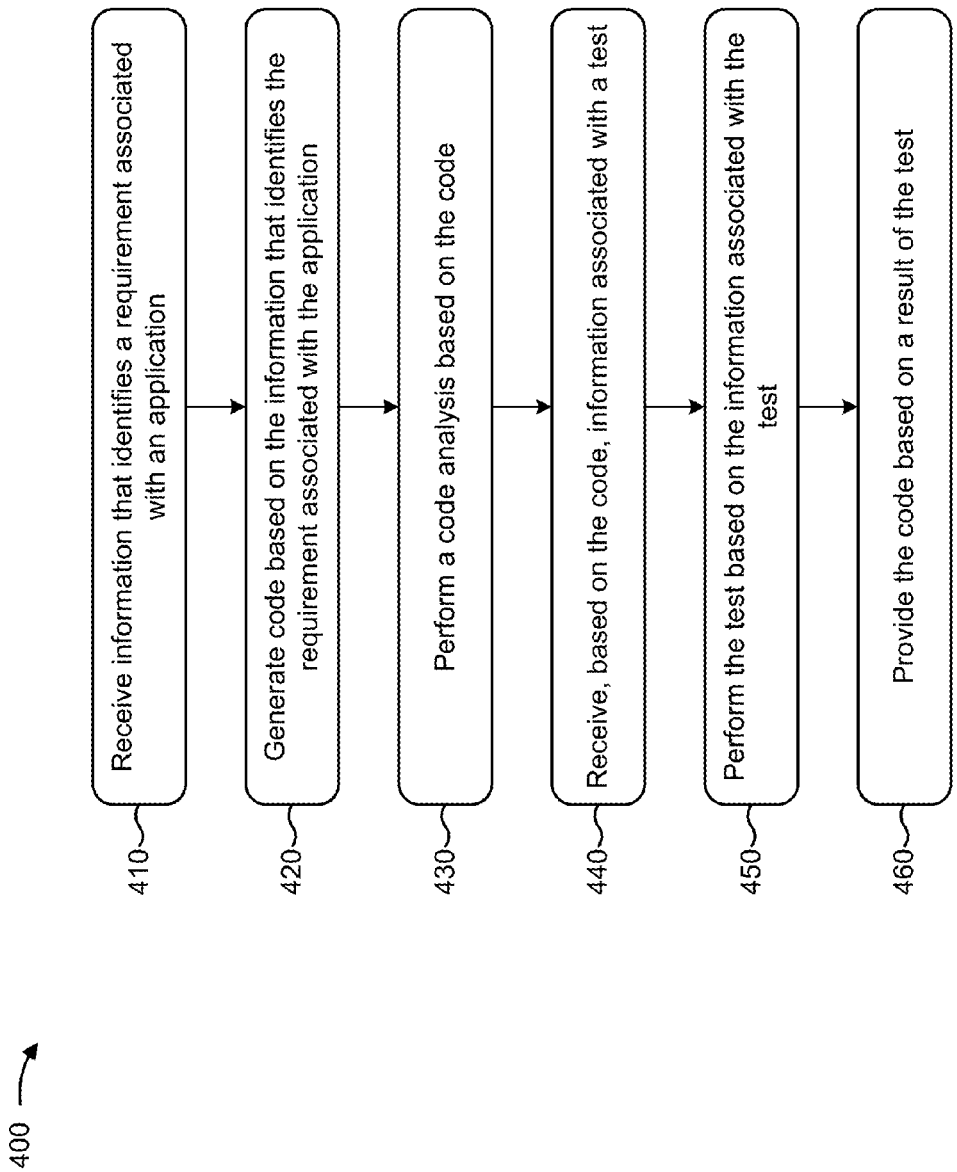
FIG. 4 is a flow chart of an example process for managing a project associated with application development.

FIG. 4 is a flow chart of an example process 400 for managing a project associated with application development. In some implementations, one or more process blocks of FIG. 4 may be performed by management platform 230. In some implementations, one or more process blocks of FIG. 4 may be performed by another device or a group of devices separate from or including management platform 230, such as user device 210, application device 220, and/or repository device 240.

As shown in FIG. 4, process 400 may include receiving information that identifies a requirement associated with an application (block 410). For example, management platform 230 may receive information that identifies a requirement associated with an application (e.g., may receive requirements instructions associated with a computer program product). In some implementations, a requirement may include a functionality associated with an application (e.g., a functionality to be implemented in a software program, added to a software program, modified within a software program, removed from a software program, etc.). Additionally, or alternatively, a requirement may be associated with a project. For example, a project may be associated with developing, testing, and/or deploying an application.

In some implementations, application device 220 may be associated with a customer relationship management (CRM) system that may be configured to receive information from user devices 210, execute CRM applications (and/or other applications), provide information to user devices 210 (e.g., webpages, services, customer data, etc.), or the like. Additionally, or alternatively, application device 220 may be associated with a relational database management system (RDMS), and may store, process, retrieve, etc. information associated with an entity (e.g., a user, a customer, a subscriber, etc.).

In some implementations, application device 220 may include one or more databases that store objects. For example, an object may include a data structure (e.g., a table, a relational table, a lookup table, etc.) that may be used to store information. In some implementations, an object may be associated with a field and/or a set of fields. Additionally, or alternatively, an object may be associated with a row or a column, which may include a particular instance of information (e.g., a record) associated with the field and/or the set of fields.

In some implementations, user device 210 may access an application (e.g., a computer program product) associated with application device 220, and may provide information for display (e.g., via a user interface) that is associated with an object. As an example, user device 210 may provide user interface elements (e.g., menus, lists, fields, boxes, tabs, etc.) that may enable a user to interact (e.g., input, modify, etc.) information associated with an object (e.g., data associated with one or more records). In some implementations, application device 220 may receive, from user device 210, information associated with an object, may process the information, and may generate a result (e.g., may provide a particular functionality). In some implementations, application device 220 may enable a user to develop a custom object (e.g., that includes particular fields), may enable a user to develop a custom application (e.g., that implements a particular functionality), and/or develop a custom user interface layout (e.g., that includes a particular set of user interface elements that may be provided for display), or the like. In some implementations, the requirement associated with the application may include information that identifies an object to be developed, a functionality associated with the object, and/or a particular user interface layout associated with the object.

In some implementations, management platform 230 may receive, from user device 210, information that identifies the requirement (e.g., may receive the requirements instructions). In some implementations, the information that identifies the requirement may include a resource. For example, the information that identifies the requirement may include a file (e.g., a file including a particular file type and/or format, such as a hypertext markup language (HTML) file, an extensible markup language (XML) file, a text file, a comma-separated values (CSV) file, a portable document format (PDF) file, a word processing file, a spreadsheet file (e.g., an EXCEL file), a zipped file, or the like). Additionally, or alternatively, the file may be associated with a resource identifier (e.g., a uniform resource identifier (URI), a uniform resource locator (URL), a uniform resource name (URN), a network address, a database address, or the like). In some implementations, management platform 230 may receive information identifying the file and/or a memory location at which the file is stored. Additionally, or alternatively, management platform 230 may retrieve the file.

In some implementations, user device 210 may access management platform 230 (e.g., using a resource identifier), and may access information identifying a project (e.g., via a login process). For example, management platform 230 may store information associated with a project, and may provide, to user device 210, information (e.g., status information) associated with the project (as described elsewhere herein). In some implementations, user device 210 may provide, for display via a user interface (e.g., such as a dashboard), information associated with the project, and may provide information to management platform 230 that causes management platform 230 to perform particular actions associated with the project (e.g., instructions to generate code, to perform a code analysis, perform a test, etc.).

As further shown in FIG. 4, process 400 may include generating code based on the information that identifies the requirement associated with the application (block 420). For example, management platform 230 may generate code (e.g., stubs, configurations, etc.), associated with the application and/or project, based on the information that identifies the requirement (e.g., the file). In some implementations, the file may include one or more values that may be used to generate code (e.g., requirements instructions). As an example, a file (e.g., a spreadsheet file) may include multiple fields that include particular values (e.g., input by a user). In this case, management platform 230 may identify code to be generated based on the file, and may generate code based on the particular values (e.g., may generate stubs, configurations, etc.). In this way, a user may develop an application based on inputting information into a file (e.g., instead of writing source code). Additionally, in this way, implementations described herein enable a configuration of an application (e.g., a computer program product) without requiring a high level of skill regarding computer programming and/or may reduce a quantity of time required to configure the application.

In some implementations, the code may be associated with a code component. For example, a code component may include code associated with a particular functionality of the application. In some implementations, a code component may include an object (e.g., an object associated with a CRM application). Additionally, or alternatively, the code component may be associated with a trigger. As an example, a trigger may include code that executes based on a database operation (e.g., a database manipulation language (DML) call, such as insert, update, delete, merge, upset, undelete, etc.). Additionally, or alternatively, the code component may include a class (e.g., code that may include business logic that is executed based on a trigger). Additionally, or alternatively, the code component may be associated with a user interface element. For example, the code component may specify a particular layout of a user interface, may specify particular user interface elements that are to be provided via the user interface, or the like.

In some implementations, user device 210 may provide, for display, information that identifies a list of code components. Additionally, assume that a user selects a particular code component. In this case, user device 210 may provide a particular set of fields, a form, or the like (e.g., that are associated with the code component). Additionally, assume that a user inputs particular values into the set of fields, the form, or the like. In this case, management platform 230 may receive the information that identifies the requirement based on the particular inputs.

In some implementations, management platform 230 may identify a code template based on the file. For example, a code template may include one or more lines of first code that are used to generate second code. As an example, a code template may include generic code that is used to generate unique code. In some implementations, a code template may be associated with a code component. For example, a code template may include particular syntax, semantics, etc. associated with a code component. In some implementations, management platform 230 may identify a code template based on the file. For example, a particular file may be associated with a particular code template. Additionally, or alternatively, a particular portion of a file may be associated with a particular code template. As an example, assume that the file includes a spreadsheet file. In this case, a first sheet may be associated with a code template related to a first code component, a second sheet may be associated with a code template related to a second code component, etc.

In some implementations, management platform 230 may identify multiple code templates, and may select a particular code template based on the application, based on a code component, or the like. Additionally, or alternatively, management platform 230 may select a particular code template based on the resource (e.g., the file), and/or based on information received from user device 210.

In some implementations, management platform 230 may generate code based on a code template and one or more values associated with the file (e.g., may identify the requirements instructions included in the EXCEL file, and may extract the requirements instructions). For example, a value associated with a file may map to a portion of a code template. As an example, assume that the file is a spreadsheet file that includes multiple fields. In this case, a value associated with a particular field may map to a portion of a code template. In some implementations, management platform 230 may parse the file and may identify particular values. Additionally, or alternatively, management platform 230 may determine corresponding portions of the code template, and may populate the corresponding portions of the code template with the particular values (e.g., insert the particular values into corresponding portions of the code). For example, management platform 230 may plug the requirements instructions into the application to execute a particular configuration.

In some implementations, management platform 230 may provide the code to application device 220 (e.g., a file including the code). For example, management platform 230 may provide the code to a development environment associated with application device 220. In some implementations, user device 210 may access the code (e.g., via a development console), and may enable a user (e.g., a developer) to modify the code associated with the development environment. As an example, user device 210 may access application device 220, and may provide information for display that identifies the code. In some implementations, the code template may include one or more portions that identify that additions, modifications, etc. may be required. In such instances, a user may, via user device 210, modify the code to develop the application.

In some implementations, management platform 230 may provide, to user device 210, status information based on generating the code. For example, management platform 230 may provide status information that identifies that management platform 230 generated code, that management platform 230 failed to generate code (e.g., based on an error, or the like), that management platform 230 provided the code to application device 220, or the like. In this way, a user (e.g., a developer) may identify a status of the project based on the status information.

As shown in FIG. 4, process 400 may include performing a code analysis based on the code (block 430). For example, management platform 230 may parse the code (e.g., the generated code, the generated code that has been modified by a user, other code associated with the application, etc.), and may perform a code analysis. In some implementations, management platform 230 may receive, from user device 210, a request to perform the code analysis, and may perform the code analysis based on the request. Additionally, or alternatively, management platform 230 may perform the code analysis based on generating the code, based on a time frame (e.g., every day, every week, etc.), or the like.

In some implementations, management platform 230 may determine particular issues associated with the code based on performing the code analysis. For example, management platform 230 may determine whether the code adheres to or violates a particular standard (e.g., best practices information, coding principles, industry specific standards, project-specific standards, or the like), may determine whether security issues and/or security vulnerabilities exist, may determine whether comments have been added, may determine whether naming conventions have been followed, etc. As an example, for CRM applications, management platform 230 may determine whether the code properly handles records (e.g., particular data associated with an object) in bulk, may determine whether database operations (e.g., queries, DML statements, etc.) are included within for loops, may identify loop redundancies, may identify redundancies of triggers associated with particular objects, may identify hardcoded uniform resource identifiers, may identify queries that do not include limits, etc.

In some implementations, management platform 230 may perform a static program analysis technique (e.g., a denotational semantics technique, an operational semantics technique, or the like), a dynamic program analysis technique (e.g., a runtime verification technique, a runtime error detection technique, a profiling technique, or the like), or the like.

In some implementations, management platform 230 may store information associated with the code analysis, and may provide status information to user device 210. For example, user device 210 may provide information for display that identifies the results of the code analysis. In this way, the code may be modified based on the results. For example, management platform 230 may modify the code based on an identified error, based on an identified issue, may specify particular portions of code that may be associated with an error and/or an issue, or the like. In this way, processor and/or memory resources of computing devices (e.g., that execute the code) may be conserved based on the modifications.

As further shown in FIG. 4, process 400 may include receiving, based on the code, information associated with a test (block 440). For example, management platform 230 may receive information associated with performing a test (e.g., a regression test, a characterization test, a quality control test, an ad-hoc test, an acceptance test, an accessibility test, an agile test, an application programming interface (API) test, a pair wise test, a boundary value test, a browser compatibility test, a compatibility test, a component test, a condition coverage test, a load test, a penetration test, a security test, a sanity test, a stability test, a stress test, a system integration test, a user acceptance test, or the like). For example, management platform 230 may receive testing instructions, including testing data and a testing script, in a particular format (e.g., a spreadsheet format, such as an EXCEL sheet format).

In some implementations, a test may be used to verify that previously developed and tested software continues to perform correctly after a modification to an application under test (AUT), may be used to verify that the AUT executes in a particular manner, may be used to determine compatibility with particular operating systems and/or web browsers, etc. In some implementations, the AUT may include a software program that includes modified code, such as added code, revised code, deleted code, and/or the like. For example, the modified code may include the generated code (e.g., generated by management platform 230), and/or generated code that has been modified by a user. In some implementations, the modified code may enable additional functionality associated with the AUT, and the AUT may be tested to ensure that the additional functionality is implemented correctly and/or does not negatively impact the AUT. Additionally, or alternatively, the AUT may be retested to ensure that the modified code does not negatively affect existing functionality associated with the AUT (e.g., a regression test may be performed).

In some implementations, management platform 230 may receive information associated with a test. For example, the information associated with the test may include a resource (e.g., a file). In some implementations, management platform 230 may receive a file including a test script and test data. For example, a test script may include a set of instructions that may be used to test the AUT (e.g., using the test data). In some implementations, a test script may be associated with a test case. For example, a test case may include a particular set of inputs, to the AUT, that may cause the AUT to generate a result. In some implementations, management platform 230 may receive, from user device 210, information identifying the file and/or a memory location at which the file is stored. Additionally, or alternatively, management platform 230 may retrieve the file.

In some implementations, management platform 230 may receive a file, and may determine a particular test to perform based on the file. Additionally, or alternatively, management platform 230 may receive information that identifies a test to perform, and may identify a particular file that may be used to perform the test. Additionally, or alternatively, management platform 230 may identify a particular file, to be used to perform the test, based on the type of AUT. In some implementations, management platform 230 may identify a particular code component associated with the AUT, and may identify a particular resource based on the code component. In this way, management platform 230 may conserve processor and/or memory resources by using a file that is suited for the type of application (e.g., type of code component) as compared to using another file that is not suited for the type of application.

As shown in FIG. 4, process 400 may include performing the test based on the information associated with the test (block 450). For example, management platform 230 may parse the file, may identify particular instructions based on parsing the file, and may provide particular inputs to the AUT based on the instructions (e.g., may convert the testing instructions and may execute the testing instructions). As an example, management platform 230 may provide particular inputs to application device 220 (e.g., associated with the AUT).

In some implementations, the file (e.g., the information identifying the test) may include a test script that identifies particular inputs to the AUT. As an example, assume that the file is a spreadsheet file. In this case, a particular sheet may correspond to a test script (e.g., a test case). Additionally, or alternatively, particular fields associated with the sheet may correspond to particular instructions (e.g., inputs to the AUT). In some implementations, management platform 230 may identify a test case based on the file, and may identify particular instructions based on one or more fields of the file (e.g., may identify a set of commands associated with the EXCEL file and may extract the set of commands associated with the EXCEL file). For example, management platform 230 may identify particular instructions based on values associated with particular fields of the file. Additionally, or alternatively, management platform 230 may determine corresponding inputs to the AUT, and may provide the particular inputs to the AUT (e.g., may convert the testing instructions, and may execute the testing instructions). For example, management platform 230 may convert the testing instructions from a first format (e.g., an EXCEL sheet format) to a second format (e.g., a SELENIUM format). In some implementations, a SELENIUM format may include a test script associated with a software tool (e.g., SELENIUM) associated with software testing of web applications via a web browser. In some implementations, management platform 230 may identify an EXCEL test script associated with the EXCEL file, and may convert the EXCEL test script into a SELENIUM test script. In this way, implementations described herein enable a user to write a test script in an EXCEL sheet (e.g., using an EXCEL format), thereby reducing a level of programming knowledge required to perform a test.

In some implementations, management platform 230 may provide a test case (e.g., one or more inputs) to the AUT (e.g., may execute the testing instructions). Additionally, or alternatively, management platform 230 may determine an actual result associated with the test case. For example, an actual result may refer to a result generated by the AUT (e.g., based on processing a test case). For example, the AUT may receive input values, associated with the test case, may process the input values, and may generate an output value or values. In some implementations, management platform 230 may use a test suite (e.g., a set of test scenarios that may be designed to ensure that the AUT is accurate and/or provides correct functionality) to test the AUT.

In some implementations, management platform 230 may compare the actual results and expected results. For example, an expected result may refer to an anticipated result (e.g., as identified by a user), a previous result (e.g., a previous known working version of the AUT or a baseline version of the AUT), or the like. Additionally, or alternatively, management platform 230 may compare an output value associated with an actual result and an output value associated with an expected result, and may determine whether the output values match. In some implementations, management platform 230 may determine a designation associated with a test case based on comparing the output values. For example, if the output values match, then management platform 230 may determine a designation associated with "pass," "positive," or the like. Alternatively, if the output values do not match, then management platform 230 may determine a designation of "fail," "negative," or the like.

In some implementations, management platform 230 may provide, to user device 210, status information based on the test. For example, management platform 230 may provide information associated with a test case, such as a designation, a screenshot associated with an output of the AUT, an input value that generated an output value that did not match an expected result, or the like. In some implementations, management platform 230 may perform an action, such as automatically correct an issue associated with the code, may suggest a particular recommendation based on the test, may identify (e.g., highlight, etc.) particular portions of the code that are associated with issues and/or that may have generated issues, or the like.

As further shown in FIG. 4, process 400 may include providing the code based on a result of the test (block 460). For example, management platform 230 may provide the code to a production environment of application device 220 based on a result of the test. In some implementations, a production environment may include a controlled environment at which an application is available for use by an entity (e.g., a customer, a user, or the like). In some implementations, management platform 230 may provide the result based on an actual result matching an expected result, or the like.

In some implementations, management platform 230 may retrieve the code from a particular environment of application device 220, such as a development environment, a testing environment, a user acceptance testing environment, etc., and may provide the code to repository device 240 (e.g., for source code management functionality, distributed revision control, or the like). Additionally, or alternatively, management platform 230 may provide the code to application device 220 (e.g., based on providing the code to repository device 240). Additionally, or alternatively, management platform 230 may cause the code to be provided to the production environment of application device 220. In some implementations, management platform 230 may provide the code to the production environment based on the test (e.g., based on an actual result matching an expected result, based on output values matching input values, etc.).

In some implementations, management platform 230 may receive, from application device 220, information associated with the application based on providing the code to the production environment. For example, management platform 230 may receive information that identifies issues associated with the application (e.g., crashes, bugs, etc.), may receive information that identifies users' feedback regarding the application, or the like. In some implementations, management platform 230 may receive information associated with the application, and may provide information to user device 210 (e.g., identifying the particular issues, particular recommendations, etc.).

In some implementations, management platform 230 may permit and/or cause an action to be performed based on providing the code to the production environment. Additionally, or alternatively, management platform 230 may permit and/or cause an action to be performed based on performing another part of process 400. In some implementations, management platform 230 may perform an action and/or cause another device to perform an action based on providing the code to the production environment. In some implementations, management platform 230 may provide, and/or may cause another device to provide, a message to user device 210. For example, management platform 230 may cause a message (e.g., an email or a short message service (SMS) message) to be sent to user device 210 based on generating the code, performing the test, and/or providing the code to the production environment. In this way, management platform 230 may notify a user (e.g., a subject matter expert, a programmer, a developer, a tester, etc.) of the status of a particular project, may notify a particular user to perform an action (e.g., modify code, verify testing results, etc.).

In some implementations, management platform 230 may coordinate user devices 210 based on generating the code, performing the test, and/or providing the code to the production environment. For example, management platform 230 may coordinate user devices 210 (e.g., coordinate calendar applications associated with user devices 210 to schedule a meeting), and may provide status information identifying a particular status of the project.

In some implementations, management platform 230 may automatically orchestrate additional testing, automatically perform a debugging process of the application, automatically analyze code associated with the application and suggest a particular correction, automatically identify code associated with a potential defect, or the like. For example, management platform 230 may receive, from application device 220, information associated with the application (e.g., information identifying an issue, a failure, etc.), and may automatically perform one or more of the above operations. In this way, implementations described herein may reduce a quantity of errors associated with code and/or an application, thereby conserving processor and/or memory resources of computing device (e.g., devices executing the application).

Implementations described herein enable management platform 230 to receive a resource and automatically generate code based on the resource. In this way, management platform 230 may reduce an amount of manual code generation required for application development, and may increase a quality of code, thereby conserving processor and/or memory resources of computing devices associated with code development and/or execution. Additionally, implementations described herein enable management platform 230 to receive another resource, and perform a test associated with the application. In this way, implementations described herein enable management platform 230 to automatically identify issues associated with code, provide recommendations based on the issues, and/or correct the issues. In this way, implementations described herein may additionally conserve processor and/or memory resources of computing devices by improving code quality, reducing code issues, etc.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
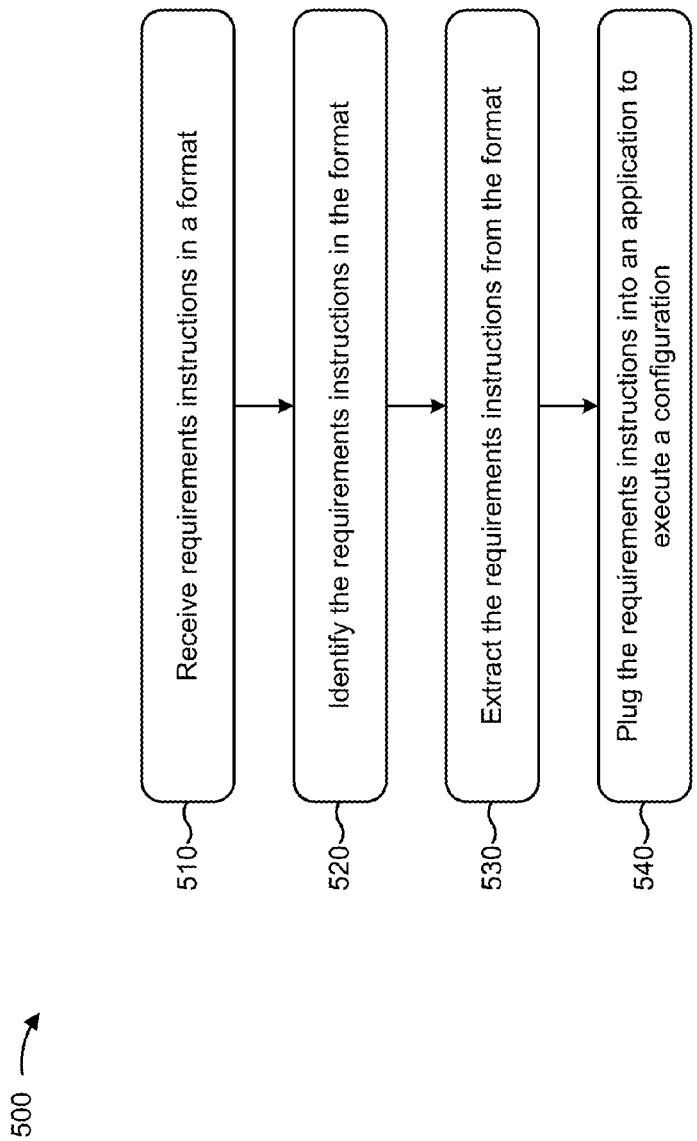
FIG. 5 is a flow chart of an example process for plugging requirements instructions into an application.

FIG. 5 is a flow chart of an example process 500 for plugging requirements instructions into an application. In some implementations, one or more process blocks of FIG. 5 may be performed by management platform 230. In some implementations, one or more process blocks of FIG. 5 may be performed by another device or a group of devices separate from or including management platform 230, such as user device 210, application device 220, and/or repository device 240.

As shown in FIG. 5, process 500 may include receiving requirements instructions in a format (block 510). For example, management platform 230 may receive information that identifies a requirement associated with an application (e.g., requirements instructions associated with a computer program product). In some implementations, the format may include a spreadsheet format (e.g., an EXCEL sheet format, or the like). In some implementations, management platform 230 may receive the requirements instructions in a similar manner as described above in connection with block 410 of FIG. 4.

As further shown in FIG. 5, process 500 may include identifying the requirements instructions in the format (block 520). For example, management platform 230 may identify the requirements instructions in the format. In some implementations, management platform 230 may identify the requirements instructions based on reading a command keyword from a spreadsheet file (e.g., an EXCEL sheet file). For example, a command keyword may be associated with a particular value of the spreadsheet file (e.g., associated with a field, a row, a column, etc.). In some implementations, management platform 230 may identify the requirements instructions in a similar manner as described above in connection with block 420 of FIG. 4.

As further shown in FIG. 5, process 500 may include extracting the requirements instructions from the format (block 530). For example, management platform 230 may extract the requirements instructions from the format based on determining an action to take in association with the application (e.g., the computer program product). In some implementations, management platform 230 may extract the requirements instructions from the format in a similar manner as described above in connection with block 420 of FIG. 4.

As further shown in FIG. 5, process 500 may include plugging the requirements instructions into an application to execute a configuration (block 540). For example, management platform 230 may plug the requirements instructions into the application (e.g., the computer program product) to execute a configuration. For example, a configuration may include a particular functionality of the application. In some implementations, management platform 230 may plug the requirements instructions into the application in a similar manner as described above in connection with block 420 of FIG. 4.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for converting testing instructions from a first format into a second format and executing the testing instructions. In some implementations, one or more process blocks of FIG. 6 may be performed by management platform 230. In some implementations, one or more process blocks of FIG. 6 may be performed by another device or a group of devices separate from or including management platform 230, such as user device 210, application device 220, and/or repository device 240.

As shown in FIG. 6, process 600 may include receiving testing instructions, including testing data and a testing script, in a first format (block 610). For example, management platform 230 may receive testing instructions, including testing data and a testing script, in a first format. In some implementations, the first format may include a spreadsheet format (e.g., an EXCEL sheet format). In some implementations, management platform 230 may receive testing instructions in the first format in a similar manner as described above in connection with block 440 of FIG. 4.

As further shown in FIG. 6, process 600 may include identifying a set of commands in the first format (block 620). For example, management platform 230 may identify a set of commands in the first format. In some implementations, management platform 230 may identify a set of commands in the first format in a similar manner as described above in connection with block 450 of FIG. 4.

As further shown in FIG. 6, process 600 may include extracting the set of commands from the first format (block 630). For example, management platform 230 may extract the set of commands based on identifying the set of commands. In some implementations, management platform 230 may identify the set of commands in a similar manner as described above in connection with block 450 of FIG. 4.

As further shown in FIG. 6, process 600 may include converting the testing instructions from the first format to a second format based on extracting the set of commands (block 640). For example, management platform 230 may convert the testing instructions from the first format (e.g., the spreadsheet format) to a second format. In some implementations, the second format may include a software testing format (e.g., a Selenium format). For example, the second format may be associated with a software testing format that enables software testing of applications (e.g., applications accessible via a webpage and/or via a web browser, or the like). In some implementations, management platform may convert the testing instructions in a similar manner as described above in connection with block 450 of FIG. 4.

As further shown in FIG. 6, process 600 may include executing the testing instructions based on the second format (block 650). For example, management platform 230 may execute the testing instructions based on the second format. In some implementations, management platform 230 may execute the testing instructions to perform a test of the application (e.g., the computer program product). In some implementations, management platform 230 may execute the testing instructions in a similar manner as described above in connection with block 450 of FIG. 4.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Implementations described herein enable a management platform to receive resources and automatically generate code and perform a test based on the resources. In this way, implementations described herein may reduce an amount of manual code generation and manual test script generation, thereby conserving processor and/or memory resources of computing devices used to generate the code and/or test script. Additionally, in this way, implementations described herein may reduce an amount of inconsistent code quality, higher review timelines, manual code versioning, environmental issues due to manual validations. Additionally, in this way, implementations described herein may improve consistent code quality, may reduce time to market, may provide real time progress notifications, may enable development of the application without reconfiguration or adjustment, may enable compatibility with multiple devices, may enable a user to identify a status of the development on a mobile device, etc.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

As used herein, code is to be broadly interpreted to include text-based code that may not require further processing to execute (e.g., C++ code, hypertext mark-up language (HTML) code, Java code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like. In some implementations, code may include different combinations of the above-identified classes of code (e.g., text-based code, binary code, text files, source code, machine code, etc.). Additionally, or alternatively, code may be of any type, such as a function, a script, an object, etc. As used herein, a code component may refer to a particular type of code, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
      receive information that identifies a requirement associated with a project,
         the information being received from a user interface of a user device,
         the project related to development of a computer program product,
         the requirement including a resource,
            the resource being associated with a file in a particular format;
      identify requirements instructions associated with the computer program product,
         the requirements instructions being included in the file;
      extract the requirements instructions from the file in the particular format;
      generate code based on the requirement being identified by requirements instructions, the requirement being associated with the computer program product;
      perform a code analysis associated with the computer program product,
         the code analysis being performed by parsing the code;
      identify an issue with the computer program product based on the code analysis;
      provide, to the user device, information that identifies the issue,
         the information including status information;
      receive, from the user device, modification to the computer program product based on the issue;
      receive testing instructions, for performing testing of the code of the computer program product, in a first format,
         the testing instructions being associated with another file,
            the other file being in the first format, and
            the other file including instructions regarding capturing a screenshot of an output associated with the computer program product,
         the testing instructions including testing data and a testing script,
         the testing data and the testing script being associated with the first format;
      identify a set of commands in the first format;
      extract the set of commands from the first format;
      convert the testing instructions from the first format to a second format based on extracting the set of commands;
      execute the testing instructions based on the second format;
      receive a result, associated with a test case, based on executing the testing instructions;
      compare the result with an expected result of the test case;
      determine a designation associated with a test case based on the comparison;
      provide, to the user device, the designation and information that identifies a particular field that may have generated the designation;
      provide, to the user device, a particular user interface element,
         the particular user interface element being associated with a screenshot,
         the particular user interface element, when interacted with by a user, causes the screenshot to be displayed,
         the screenshot being associated with an output of the computer program product based upon particular inputs; and
      deploy, after providing the designation and the information that identifies the particular field that may have generated the designation, the modified computer program product to a production environment via the user interface of the user device.

2. The device of claim 1, where the first format is a spreadsheet format.

3. The device of claim 1, where the second format is a software testing format.

4. The device of claim 1, where the one or more processors are further to:
receive requirements instructions in a third format;
identify the requirements instructions in the third format;
extract the requirements instructions from the third format; and
plug the requirements instructions into the computer program product to execute a configuration.

5. The device of claim 4, where the third format is a spreadsheet format.

6. The device of claim 1, where the one or more processors are further to:
provide, to the user device, information that identifies the test case based on comparing the result and the expected result.

7. The device of claim 1, where the one or more processors are further to:
provide the code, associated with the computer program product, to an application device based on executing the testing instructions,
the application device to enable access to the computer program product.

8. A non-transitory computer-readable medium storing instructions, the instructions comprising:
one or more instructions that, when executed by one or more processors, cause the one or more processors to:
receive information that identifies a requirement associated with a project,
the information being received from a user interface of a user device,
the project related to development of a computer program product,
the requirement including a resource,
the resource being associated with a file in a particular format;
identify requirements instructions associated with the computer program product,
the requirements instructions being included in the file;
extract the requirements instructions from the file in the particular format;
generate code based on the requirement being identified by the requirements instructions, the requirement being associated with the computer program product;
perform a code analysis associated with the computer program product,
the code analysis being performed by parsing the code;
identify an issue with the computer program product based on the code analysis;
provide, to the user device, information that identifies the issue,
the information including status information;
receive, from the user device, modification to the computer program product based on the issue;
receive testing instructions, for testing the code of the computer program product, in a first format,
the testing instructions being associated with another file,
the other file being in the first format, and
the other file including instructions regarding capturing a screenshot of an output associated with the computer program product,
the testing instructions including testing data and a testing script,
the testing data and the testing script being associated with the first format;
identify a set of commands in the first format;
extract the set of commands from the first format;
convert the testing instructions from the first format to a second format based on extracting the set of commands;
execute the testing instructions based on the second format;
receive a result, associated with a test case, based on executing the testing instructions;
compare the result with an expected result of the test case;
determine a designation associated with a test case based on the comparison;
provide, to the user device, the designation and information that identifies a particular field that may have generated the designation; and
provide, to the user device, a particular user interface element,
the particular user interface element being associated with a screenshot,
the particular user interface element, when interacted with by a user, causes the screenshot to be displayed,
the screenshot being associated with an output of the computer program product based upon particular inputs; and
deploy, after providing the designation and the information that identifies the particular field that may have generated the designation, the modified computer program product to a production environment via the user interface of the user device.

9. The non-transitory computer-readable medium of claim 8, where the first format is an Excel sheet format.

10. The non-transitory computer-readable medium of claim 8, where the second format is a Selenium format.

11. The non-transitory computer-readable medium of claim 8, where the one or more instructions, when executed by the one or more processors, further cause the one or more processors to:
receive requirements instructions in a third format;
identify the requirements instructions in the third format;
extract the requirements instructions from the third format; and
plug the requirements instructions into the computer program product to execute a configuration.

12. The non-transitory computer-readable medium of claim 11, where the third format is an Excel sheet format.

13. The non-transitory computer-readable medium of claim 8, where the one or more instructions, when executed by the one or more processors, further cause the one or more processors to:
provide the code, associated with the computer program product, to an application device based on executing the testing instructions,
the application device to enable access to the computer program product.

14. The non-transitory computer-readable medium of claim 8, where the second format is a software testing format that enables software testing of applications accessible via a webpage and/or via a web browser.

15. A method, comprising:
receiving, by a device, information that identifies a requirement associated with a project,
the information being received from a user interface of a user device,
the project related to development of a computer program product,
the requirement including a resource,
the resource being associated with a file in a particular format;
identifying, by the device, requirements instructions associated with the computer program product,
the requirements instructions being included in the file;
extracting, by the device, the requirements instructions from the file in the particular format;
generating, by the device, code based on the requirement being identified by the requirements instructions, the requirement being associated with the computer program product;
performing, by the device a code analysis associated with the computer program product,
the code analysis being performed by parsing the code;
identifying, by the device, an issue with the computer program product based on the code analysis;
providing, by the device and to the user device, information that identifies the issue,
the information including status information;
receiving, by the device and from the user device, modification to the computer program product based on the issue;
receiving, by the device, testing instructions, for testing the code of the computer program product, in a first format,
the testing instructions being associated with another file,
the other file being in the first format, and
the other file including instructions regarding capturing a screenshot of an output associated with the computer program product,
the testing instructions including testing data and a testing script,
the testing data and the testing script being associated with the first format;
identifying, by the device, a set of commands in the first format;
extracting, by the device, the set of commands from the first format;
converting, by the device, the testing instructions from the first format to a second format based on extracting the set of commands;
executing, by the device, the testing instructions based on the second format;
comparing, by the device, a result associated with a test case with an expected result of the test case;
determining, by the device, a designation associated with the test case based on the comparison;
providing, by the device and to the user device, the designation and information that identifies a particular field that may have generated the designation;
providing, to the user device, a particular user interface element,
the particular user interface element being associated with a screenshot,
the particular user interface element, when interacted with by a user, causes the screenshot to be displayed
the screenshot being associated with an output of the computer program product based upon particular inputs; and
deploying, by the device, after providing the designation and the information that identifies the particular field that may have generated the designation, the modified computer program product to a production environment via the user interface of the user device.

16. The method of claim 15, where the first format is a spreadsheet format.

17. The method of claim 15, where the second format is a software testing format.

18. The method of claim 15, further comprising:
receiving requirements instructions in a third format;
identifying the requirements instructions in the third format;
extracting the requirements instructions from the third format; and
plugging the requirements instructions into the computer program product to execute a configuration.

19. The method of claim 18, where the third format is a spreadsheet format.

20. The method of claim 15, further comprising:
providing the code, associated with the computer program product, to an application device based on executing the testing instructions,
the application device to enable access to the computer program product.

* * * * *